United States Patent
Rabii

(10) Patent No.: US 9,043,797 B2
(45) Date of Patent: May 26, 2015

(54) USING PAUSE ON AN ELECTRONIC DEVICE TO MANAGE RESOURCES

(75) Inventor: Khosro M. Rabii, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 602 days.

(21) Appl. No.: 12/912,359

(22) Filed: Oct. 26, 2010

(65) Prior Publication Data

US 2012/0102191 A1    Apr. 26, 2012

(51) Int. Cl.
*G06F 9/46* (2006.01)
*G06F 9/50* (2006.01)

(52) U.S. Cl.
CPC .................................. *G06F 9/5011* (2013.01)

(58) Field of Classification Search
CPC .................................................... G06F 9/5011
See application file for complete search history.

(56) References Cited

U.S. PATENT DOCUMENTS

| | | | | |
|---|---|---|---|---|
| 7,010,801 B1* | 3/2006 | Jerding et al. | | 725/95 |
| 2003/0194211 A1* | 10/2003 | Abecassis | | 386/69 |
| 2005/0071882 A1 | 3/2005 | Rodriguez et al. | | |
| 2005/0157660 A1 | 7/2005 | Mandato et al. | | |
| 2005/0278760 A1 | 12/2005 | Dewar et al. | | |
| 2006/0080474 A1* | 4/2006 | Horii et al. | | 710/8 |
| 2007/0038989 A1* | 2/2007 | Newton et al. | | 717/166 |
| 2007/0188144 A1* | 8/2007 | Hara et al. | | 320/132 |
| 2007/0192818 A1* | 8/2007 | Bourges-Sevenier et al. | | 725/132 |
| 2007/0288777 A1 | 12/2007 | Schutte | | |
| 2008/0212525 A1 | 9/2008 | Tervonen et al. | | |
| 2008/0320481 A1* | 12/2008 | Peng | | 718/103 |
| 2009/0046205 A1 | 2/2009 | Strasser et al. | | |
| 2009/0172182 A1 | 7/2009 | Yoon | | |
| 2009/0228893 A1* | 9/2009 | Behrendt et al. | | 718/105 |

OTHER PUBLICATIONS

International Search Report and Written Opinion—PCT/US2011/057374—ISA/EPO—May 2, 2012.

* cited by examiner

*Primary Examiner* — Meng An
*Assistant Examiner* — James J Lee
(74) *Attorney, Agent, or Firm* — Michael DeHaemer; Elaine H. Lo

(57) ABSTRACT

An electronic device for using pause to manage resources is described. The electronic device includes a processor and instructions stored in memory. The electronic device monitors a pause duration and determines whether to perform a resource management operation based on the pause duration. The electronic device performs the resource management operation based on the pause duration.

22 Claims, 14 Drawing Sheets

USING PAUSE ON AN ELECTRONIC DEVICE TO MANAGE RESOURCES

TECHNICAL FIELD

The present disclosure relates generally to electronic devices. More specifically, the present disclosure relates to using pause to manage resources.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Recently, the use of networks has also greatly increased. Many electronic devices obtain data using such networks. For example, many electronic devices download or stream data from other electronic devices connected to a network. For instance, an electronic device might download a file from a remote server using the Internet. Some electronic devices obtain data using a wireless connection to a network, such as wireless communication devices. Other electronic devices such as personal computers may use a wired connection to a network.

At times, electronic devices may use resources inefficiently. For example, an electronic device may perform processes or operations that provide little or no immediate benefit to the user of the electronic device. Such inefficiencies may unnecessarily consume resources, thereby reducing the usefulness of the electronic device. As this discussion illustrates, improved systems and methods for managing these inefficiencies may be beneficial.

SUMMARY

An electronic device is disclosed. The electronic device includes a processor and instructions stored in memory. The electronic device monitors a pause duration. The electronic device determines whether to perform a resource management operation based on the pause duration and performs the resource management operation based on the pause duration.

The electronic device may progressively deconstruct a multimedia ecosystem based on the pause duration. The electronic device may evaluate one or more resource management factors. The one or more resource management factors may include the pause duration. The one or more resource management factors may also include a content source, power resources remaining, a device temperature, one or more concurrent tasks, a user behavior, user requirements, a continued operation expectation, a content type, a distant acknowledgment, a content format, a content duration and a communication configuration.

The one or more resource management factors may further include processor usage, memory usage and power usage. The one or more resource management operations may include outputting a prompt, terminating one or more applications, discontinuing decoding, allowing standby, notifying one or more remote devices, notifying one or more locally networked devices and caching processed data.

Monitoring the pause duration may include detecting a pause operation and determining whether the pause duration is greater than or equal to one or more pause duration thresholds. Monitoring the pause duration may also include determining whether a pause operation is ongoing and restoring content playback if the pause operation is not ongoing.

The resource management operation may control local resources. The resource management operation may control distant resources. Evaluating the one or more resource management factors may include obtaining one or more resource management factor inputs and determining one or more weights.

Determining whether to perform a resource management operation may include determining an operation value and selecting one or more resource management operations based on the operation value. The electronic device may be a wireless communication device. Multimedia content may be paused.

A method for using a pause duration to manage resources is disclosed. The method includes monitoring the pause duration on an electronic device. The method also includes determining whether to perform a resource management operation based on the pause duration and performing the resource management operation based on the pause duration on the electronic device.

A computer-program product for using a pause duration to manage resources is disclosed. The computer-program product includes instructions on a non-transitory computer-readable medium. The instructions include code for causing an electronic device to monitor the pause duration. The instructions also include code for causing the electronic device to determine whether to perform a resource management operation based on the pause duration and code for causing the electronic device to perform the resource management operation based on the pause duration.

An apparatus for using a pause duration to manage resources is disclosed. The apparatus includes means for monitoring the pause duration. The apparatus also includes means for determining whether to perform a resource management operation based on the pause duration and means for performing the resource management operation based on the pause duration.

DETAILED DESCRIPTION

Figure 1:
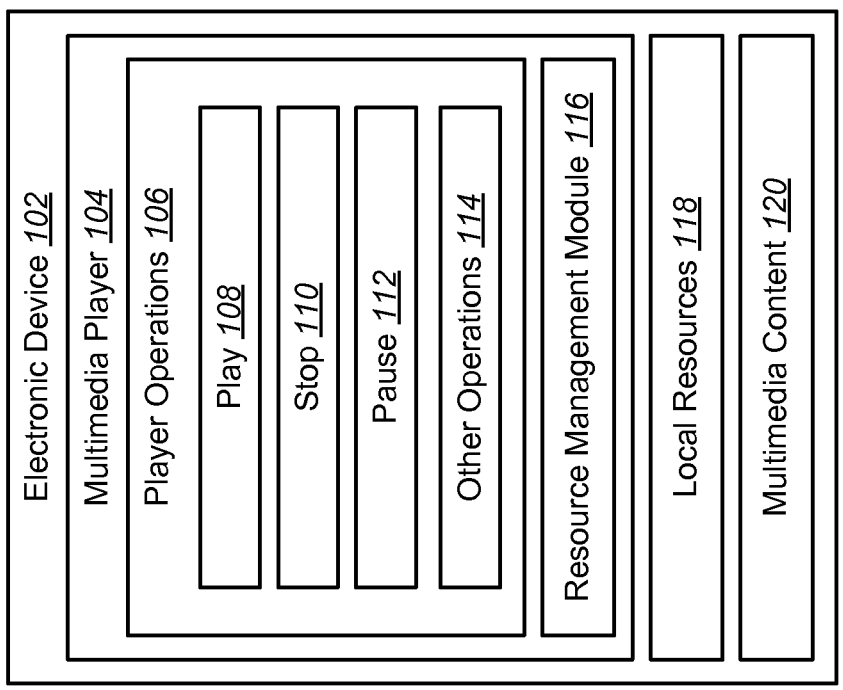
FIG. 1 is a block diagram illustrating one configuration of an electronic device in which systems and methods for using pause to manage resources may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that a base station may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes an electronic device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

An electronic device includes a multimedia player that presents multimedia content such as audio and/or video. Examples of electronic devices include camcorders, digital cameras, cellular phones, smart phones, desktop computers, laptop computers, etc. The multimedia player may include several functions or controls, including a pause function. The pause function may be used by the electronic device to manipulate multimedia "ecosystem" operation. This "ecosystem" may include a variety of different resources and devices used to obtain and/or present the multimedia content. Such resources include, for example, power resources, processing resources, transmission/reception bandwidth, display resources, etc. These resources may be local to the electronic device and/or separate from the electronic device or "distant." Distant resources may be used by other electronic devices. Examples of local resources and devices include a local Secure Digital (SD) card and a local rendition device or display. Examples of distant resources and devices include a networked storage device and a networked rendition device such as a Bluetooth display.

Typically, a "pause" command or operation suspends some operations indefinitely. Assuming that resources are infinite (e.g., no battery lifetime issues, no memory shortages, no Operating System (OS) scheduler priority concerns, etc.), a paused multimedia ecosystem may be allowed to consume system resources as if it were operational (e.g., not paused). However, considering the scarcity of local and distant resources (e.g., battery power, memory size, OS scheduler performance, reliable availability of remote resources, etc.), it may be beneficial to manage or reduce resource consumption based on the pause function (and other factors such as user requirements, for example).

The pause function may be used to control one or more local devices and local resources and/or one or more distant devices and distant resources. For example, the pause function may be used to control a media file decoding process (e.g., audio decoding) on the electronic device and to control a distant electronic device that is sending the media file.

Depending on available resources and an expectation for reliable continued operation (especially when considering networked devices), it may be warranted to completely discontinue resource consumption caused by a pause operation. This may even be done without any plans to resume future operation. When decoding audio, for example, factors such as pause duration, whether the audio stream is local or networked, remaining battery life, device temperature and concurrent tasks, etc. may progressively prompt reducing resource consumption. This may be accomplished by discontinuing certain processes or device usage. Furthermore, if the pause operation continues for a long duration or if system resources are being rapidly depleted, the audio decoding process may be terminated altogether.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for using pause to manage resources may be implemented. The electronic device 102 includes a multimedia player 104, local resources 118 and multimedia content 120. The multimedia player 104 may be a hardware and/or software module that presents the multimedia content 120. Examples of multimedia content 120 include media such as videos, audio tracks, images, etc. In one configuration, the multimedia player 104 is a program that presents (e.g., displays, outputs, etc.) video data, image data and/or audio data. For example, the multimedia player 104 may play movies and songs. Examples of local resources 118 include processing resources, power resources, memory resources, OS resources (e.g., scheduler resources) and display resources, etc. For instance, the electronic device 102 may include a battery to power its operation, memory for storing data and a processor for processing the data.

The multimedia player 104 includes player operations 106. The player operations 106 include a pause function or operation 112. The player operations 106 may also include a play operation 108, a stop operation 110 and/or other operations 114 (e.g., fast-forward, rewind, skip, etc.). The play operation 108 may be used to begin presentation or playback of the multimedia content 120. The stop operation 110 may be used to stop presentation or playback. The pause operation 112 may be used to suspend the presentation of the multimedia content 120. For example, a user may activate the pause operation 112 during a video or audio presentation in order to suspend the presentation. In traditional usage, a pause operation suspends presentation indefinitely. Using the pause operation 112 in this fashion may be inefficient. For example, while the pause operation 112 is activated (e.g., activated locally on the electronic device 102), resources may be continually consumed. For example, while the pause operation 112 is active, the electronic device 102 may continue to consume local resources 118 (and other resources) by decoding the multimedia content 120, allocating memory, processing and presenting the paused multimedia content 120. However, the systems and methods disclosed herein may provide more efficient usage of the pause operation 112.

The resource management module 116 may be a hardware and/or software module used to manage resource consumption. As illustrated in the FIG. 1, the resource management module 116 may be included in the multimedia player 104. Alternatively or in addition, the resource management module 116 may be separate from the multimedia player 104. However, the resource management module 116 may be located on the same electronic device 102 where the pause operation 112 is located. The resource management module 116 may evaluate and control resource consumption. For example, the resource management module 116 may monitor the multimedia player 104 for pause operations 112. Based on the pause operation 112 and/or other factors, the resource management module 116 may control resource consumption. For example, the resource management module 116 may detect when the pause operation 112 is activated. If the pause operation 112 remains activated for a certain amount of time, the resource management module 116 may begin to release resources being used (e.g., by the multimedia player 104) to present the multimedia content 120. For example, the resource management module 116 may reduce or terminate a decoding process being run by a processor and/or release portions of memory being used to present the multimedia content 120. This may reduce the consumption of local resources 118 while the multimedia player 104 remains paused.

Figure 2:
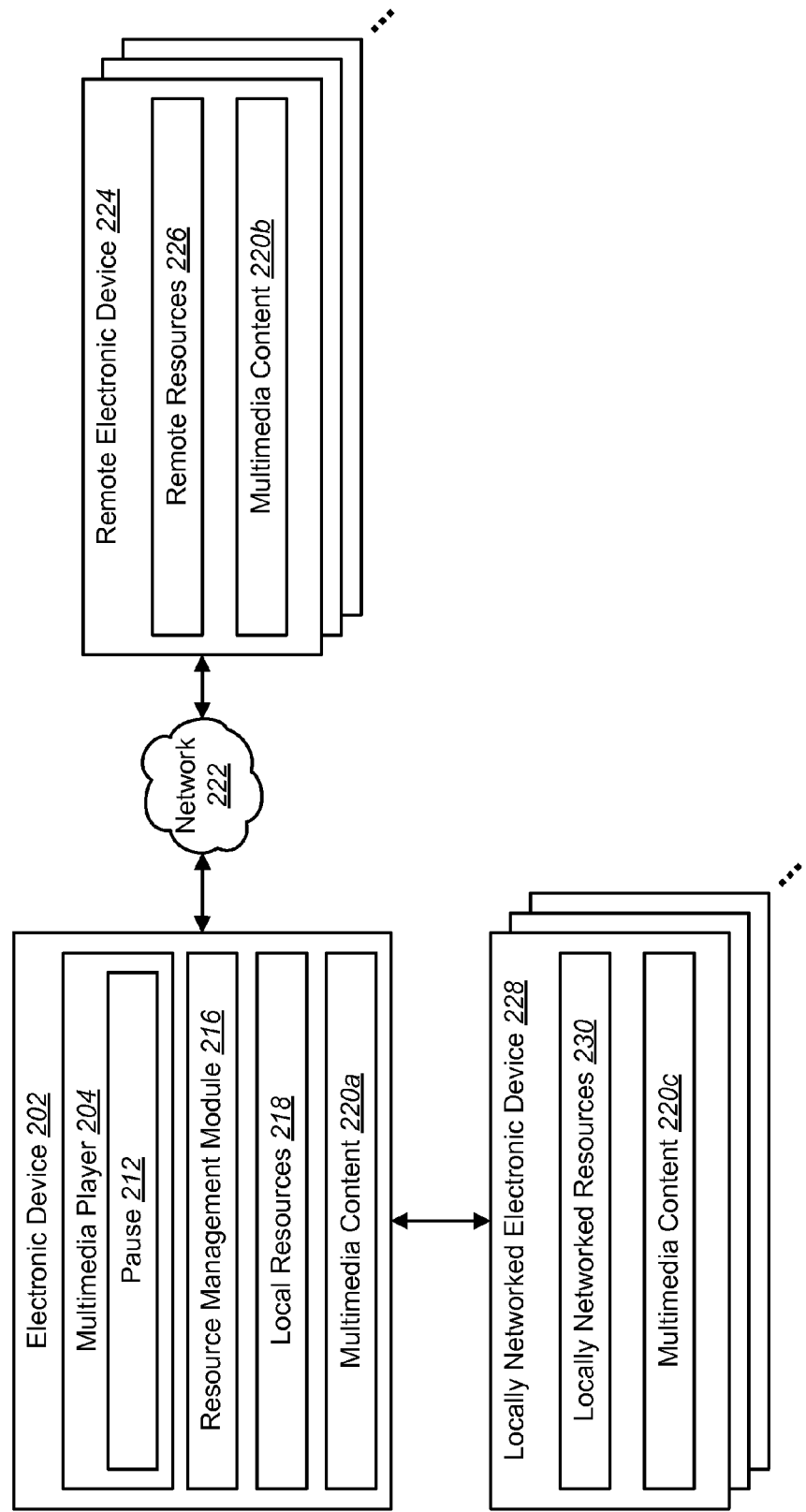
FIG. 2 is a block diagram illustrating one configuration of an electronic device, a remote electronic device and a locally networked electronic device in which systems and methods for using pause to manage resources may be implemented.

FIG. 2 is a block diagram illustrating one configuration of an electronic device 202, a remote electronic device 224 and a locally networked electronic device 228 in which systems and methods for using pause to manage resources may be implemented. The electronic device 202 may communicate with one or more remote electronic devices 224 using a network 222. Examples of the network 222 include a Local Area Network (LAN), Wide Area Network (WAN), the Internet, etc. The one or more remote electronic devices 224 include multimedia content 220b and remote resources 226. Examples of remote electronic devices 224 include desktop computers, servers, laptop computers, mobile electronic devices, etc.

The electronic device 202 may additionally or alternatively communicate with one or more locally networked electronic devices 228. For example, the electronic device 202 communicates with the locally networked electronic device 228 using a Wi-Fi (e.g., IEEE 802.11), Bluetooth, Universal Serial Bus (USB) or Ethernet link, etc. The one or more locally networked electronic devices 228 may include multimedia content 220c and locally networked resources 230. Examples of locally networked electronic devices 228 include desktop computers, laptop computers, wireless headsets, monitors or displays, gaming systems, etc. The one or more remote electronic devices 224 and the one or more locally networked electronic devices 228 may be "distant" electronic devices.

The electronic device 202 includes a multimedia player 204, a resource management module 216, local resources 218 and multimedia content 220a. The multimedia player 204 includes a pause operation 212. As illustrated in FIG. 2, the resource management module 216 is separate from the multimedia player 204. In another configuration, however, the multimedia player 204 may alternatively or additionally include a resource management module 216. The multimedia player 204 presents multimedia content 220a. For example, the multimedia player 204 plays video and/or audio (e.g., movies, music, etc.). The multimedia content 220a may be stored locally on the electronic device (e.g., cached, stored in flash memory, on a local SD card, etc.). Additionally or alternatively, the multimedia content 220a may originate "distantly" from the one or more remote electronic devices 224 and/or the one or more locally networked electronic devices 228.

The one or more remote electronic devices 224 may provide multimedia content 220b to the electronic device 202. In one configuration, the remote electronic device 224 is a web server that provides videos and/or audio (e.g., multimedia content 220b) to the electronic device 202 over the Internet (e.g., network 222). The one or more remote electronic devices 224 use remote resources 226 in order to provide the multimedia content 220b to the electronic device 202. Examples of remote resources 226 include processing, memory, communication bandwidth and power, etc.

The one or more locally networked electronic devices 228 may additionally or alternatively receive multimedia content 220c from the electronic device 202 or provide multimedia content 220c (e.g., audio, video, images, etc.) to the electronic device 202 using locally networked resources 230. For example, multimedia content 220c may be stored on a locally networked electronic device 228 for use by the electronic device 202. The one or more locally networked electronic device 228 may additionally or alternatively display multimedia content 220c originating from the electronic device 202. Examples of locally networked resources 230 include processing, memory, power (e.g., battery power), display, communication bandwidth, etc.

The resource management module 216 manages resource usage based on the pause operation 212. For example, the resource management module 216 may monitor pause operations 212, evaluate one or more resource management factors and perform one or more resource management operations. This may be done in order to manage (e.g., conserve) local resources 218, remote resources 226 and/or locally networked resources 230. For instance, the multimedia player 204 may be playing a music file (e.g., multimedia content 220a) when a pause operation 212 occurs. The resource management module 216 detects the pause operation 212. If the pause operation 212 continues for some certain duration, the resource management module 216 may evaluate resource management factors such as the remaining battery power, the amount of processing being used to maintain the paused state, the amount of memory being consumed by the multimedia content 220a presentation, concurrent tasks, etc. Based on its 216 evaluation, the resource management module 216 may determine whether to perform one or more operations. For example, if the remaining battery power is low, the amount of processing needed to maintain the paused state is rapidly depleting the remaining battery power and the electronic device 202 is concurrently engaged in a phone call, the resource management module 216 may reduce or terminate the multimedia player's 204 usage of local resources 218. For example, the resource management module 216 may discontinue an audio decoding process or discontinue the multimedia player's 204 use of local resources 218 altogether. Furthermore, the resource management module 216 may also dismiss an Internet Protocol (IP) application allowing access to the multimedia content 220 (from the remote electronic device 224 over the Internet 222), for example. Thus, the resource management module 216 may manage the consumption of local resources 218 based on the pause operation 212. In one configuration, the resource management module 216 may progressively release resources being used to maintain the paused state based on the pause duration and/or other factors. In other words, the resource management module 216 may progressively deconstruct the multimedia ecosystem.

The resource management module 216 may additionally or alternatively evaluate and/or manage remote resources 226. In one configuration, the electronic device 202 receives multimedia content 220b from the remote electronic device 224 using the network 222. For instance, the remote electronic device 224 may be a web server that is streaming a video (e.g., multimedia content 220b) to the electronic device 202 for presentation on the multimedia player 204. As discussed above, the remote electronic device 224 uses remote resources 226 to provide the multimedia content 220b to the electronic device 202. While the video is playing on the multimedia player 204, the resource management module 216 detects a pause operation 212. If the pause operation 212 continues for a certain amount of time (and the video streaming is consuming a relatively large amount of bandwidth, for example), the resource management module 216 may notify the remote electronic device 224 that the electronic device 202 is no longer presenting the video (e.g., multimedia content 220b) and/or that the remote resources 226 being used to stream the video to the electronic device 202 should be conserved. For example, the resource management module 216 may notify the remote electronic device 224 that the electronic device 202 is terminating the video stream and/or session with the remote electronic device 224.

The resource management module 216 may additionally or alternatively evaluate and/or manage locally networked resources 230. For example, assume that the locally networked electronic device 228 is storing the multimedia content 220c for presentation on the multimedia player 204. The electronic device 202 requests the multimedia content 220c, which the locally networked electronic device 228 begins to provide to the electronic device 202. The resource management module 216 then detects a pause operation 212. If the pause operation 212 continues for a given amount of time, the resource management module 216 may evaluate locally networked resources 230. For example, the resource management module 216 may obtain the amount of battery power remaining on the locally networked electronic device 228. The resource management module 216 may determine that further transfer of the multimedia content 220c should be discontinued. The resource management module 216 may send a message to the locally networked electronic device 228 in order to discontinue or suspend further transfer of the multimedia content 220c to the electronic device 202. In another example, the locally networked electronic device 228 may be a display that is used to display the multimedia content 220c. The multimedia content 220c may originate from the electronic device 202 and/or be stored on the locally networked electronic device 228. If a pause operation 212 continues for a certain duration, the resource management module 216 may notify the locally networked electronic device 228, instruct the locally networked electronic device 228 to stop displaying the multimedia content 220c, discontinue sending the multimedia content 220a and/or allow the locally networked electronic device 228 to go into a standby mode, for example. As illustrated in the above discussion, the resource management module 216 may thus evaluate and/or manage or control consumption of local resources 218, remote resources 226 and/or locally networked resources 230.

Figure 3:
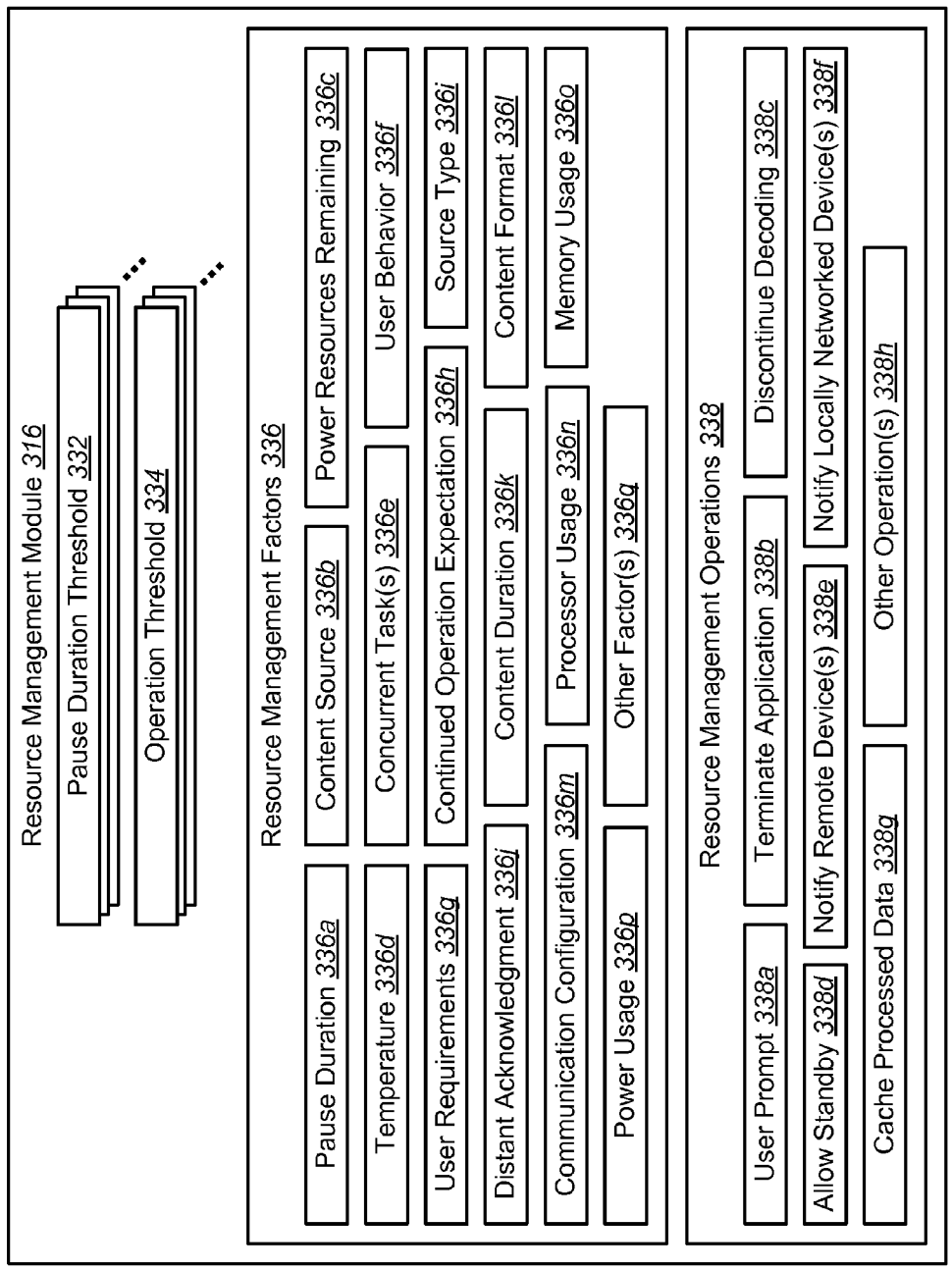
FIG. 3 is a block diagram illustrating one configuration of a resource management module.

FIG. 3 is a block diagram illustrating one configuration of a resource management module 316. The resource management module 316 may include one or more pause duration thresholds 332, one or more operation thresholds 334, one or more resource management factors 336 and/or one or more resource management operations 338. The one or more pause duration thresholds 332 may be used to trigger procedures or operations based on a pause operation 212 duration. For example, when a pause operation 212 has continued for an amount of time greater than or equal to a pause duration threshold 332, the electronic device 202 (e.g., resource management module 316) may evaluate one or more resource management factors 336 and/or perform one or more resource management operations 338. The one or more operation thresholds 334 may be used to select or trigger certain resource management operations 338 based on the resource management factors 336.

In the configuration illustrated in FIG. 3, the resource management factors 336 include pause duration 336a, content source 336b, power resources remaining 336c, temperature 336d, concurrent task(s) 336e, user behavior 336f, user requirement(s) 336g, continued operation expectation 336h, source type 336i, distant acknowledgement 336j, content duration 336k, content format 336l, communication configuration 336m, processor usage 336n, memory usage 336o and/or power usage 336p factors. Each of the resource management factors 336 may relate to local and/or distant (e.g., remote or locally networked) conditions. Other (e.g., additional or alternative) resource management factors 336q may be used.

The pause duration 336a may indicate how long a pause operation 212 has continued. For example, the resource management module 316 may start a timer when a pause operation 212 is initially detected (and reset the timer once the pause operation 212 is discontinued, for example). Additionally or alternatively, the resource management module 316 may record the beginning time of the pause operation 212 using a clock and compare the beginning time to a current time in order to determine the pause duration 336a. The pause duration 336a may be used to determine whether one or more pause duration thresholds 332 have been reached. Furthermore, the pause duration 336a may be used to determine whether and which of any resource management operations 338 may be performed.

The content source 336b may indicate the source of the multimedia content 220. For example, the multimedia content 220 may be stored locally on the electronic device 202. For instance, the multimedia content 220a may be an audio or video file that is stored on a local SD card, in flash memory, in a memory cache or in a USB device attached to the electronic device 202. However, the multimedia content 220b-c may be stored "distantly" on a remote electronic device 224 and/or a locally networked electronic device 228. For example, the multimedia content 220b may be stored on a remote electronic device 224 and streamed from the remote electronic device 224 over the network 222. For instance, the multimedia content 220b-c may be stored distantly using caching over Internet Protocol (IP). The amount of local resources 218, remote resources 226 and/or locally networked resources 230 needed to present the multimedia content 220 may vary depending on the content source 336b.

The power resources remaining 336c may indicate the amount of power resources remaining in local resources 218, remote resources 226 and/or locally networked resources 230. For example, if the electronic device 202, the remote electronic device 224 and/or the locally networked electronic device 228 use a battery, the amount of power resources remaining 336c may be limited. Thus, the power resources remaining 336c may indicate the amount of remaining battery charge. In some cases, the power resources remaining 336c be assumed to be unlimited. For example, if the electronic device 202 is plugged into a wall outlet, the power resources remaining 336c may be deemed "unlimited." The temperature factor 336d may indicate the temperature of the electronic device 202 (e.g., the electronic device's battery). For example, the temperature 336d of an electronic device 202 battery may be used to determine or estimate how quickly the battery may discharge.

The concurrent task(s) factor 336e may indicate whether one or more tasks are running concurrently with the paused multimedia content 220 and/or what those concurrent task(s) are. In one configuration, the electronic device 202 is a smart phone. The user of the smart phone may be listening to music or watching a video (e.g., multimedia content 220), when an incoming phone call is received. The presentation of the multimedia content 220 may be paused 212 while the phone call is ongoing. In this case, the concurrent task(s) 336e may indicate that the phone call is a concurrent task 336e with the presentation of the (paused) multimedia content 220. The concurrent task(s) 336e may indicate multiple concurrent tasks and/or details about the concurrent tasks. For example, assume that while the multimedia player 204 has a paused song, the electronic device 202 is also running a game application and making an emergency phone call to 911. The concurrent tasks 336e indicate that the game application is running a particular game and that a phone call is being made to the 911 phone number. Such concurrent tasks 336e may be relevant in determining whether to perform one or more resource management operations 338 and which of the one or more resource management operations 338 may be performed.

The user behavior factor 336f may indicate certain user behaviors. For example, user behavior 336f may include data such as historical and/or expected behavior in the use of the electronic device 202. For example, user behavior 336f may indicate that a user tends to make long phone calls with one or more particular phone numbers. It 336f may also indicate an average or expected pause duration 336a (which may be further broken down into pause durations for genres, types or sources of multimedia content 220, etc.). Another example of information that may be included in user behavior 336f is the amount of time a user is expected to play a certain game or use a particular application, etc.

The user requirements factor 336g may indicate user settings, preferences or requirements. For example, the user requirements 336g may indicate a user preference for certain thresholds 332 or resource management operations 338, etc.

For instance, a user may specify one or more desired thresholds 332 for pause duration. Furthermore, a user may specify whether or not to perform certain resource management operations 338 and/or when certain resource management operations 338 may be performed (e.g., corresponding to one or more thresholds 332). For example, a user specifies three thresholds 332: one at 5 minutes, one at a half hour and one at two hours of pause duration 336a. For the 5-minute threshold, the user requirements 336g specify that the user should be prompted 338a. At the half-hour threshold, the user requirements 336g specify that the electronic device 202 should discontinue decoding 338c. At the two-hour threshold, the user requirements 336g specify that the electronic device 202 should terminate the application 338b (e.g., the paused multimedia player 204). Other user requirements 336g may be used (e.g., whether the resource management module 316 should ever terminate an application 338b or notify a remote electronic device 338e about a prolonged pause, etc.).

The continued operation expectation factor 336h may indicate under what circumstances a user may expect the multimedia player 204 to continue to operate or quickly resume after a pause operation 212. For example, a user may expect the multimedia player 204 to operate or resume quickly even after an extended pause 212 in the situation where a large video is being streamed and buffered. A user may also expect the multimedia player 204 to operate after an extended pause 212 when the electronic device's 202 wireless connection is slow during a multimedia file download, for example.

The source type 336i may indicate a source type of multimedia content 220. For example, the source type 336i may indicate that particular multimedia content 220 is pay-per-view or time-metered. More specifically, a user might be charged according to the time spent accessing particular multimedia content 220. Another source type 336i may be a broadcast source type 336i. For example, the multimedia player 204 may play an audio stream from an Internet radio station. The source type 336i may be relevant in determining what kinds of resource management operations 338 might be useful in a particular situation. More specifically, if the multimedia player 204 is presenting multimedia content 220 that is time-metered, the remote electronic device 224 may be notified to terminate a session (even after a relatively short pause duration 336a). This may help the user avoid costs associated with multimedia content 220 that was paused for an extended duration, for example. For example, assume that a user is watching a time-metered movie being streamed from a remote electronic device 224. If the user pauses 212 the movie because of a distraction and forgets to continue later, the user may be charged for accessing the movie stream that he did not view, since it was paused.

The distant acknowledgement factor 336j may indicate whether and/or when a remote electronic device 224 and/or locally networked electronic device 228 are attempting to acknowledge the electronic device 202. For example, a remote electronic device 224 and/or locally networked electronic device 228 may seek acknowledgement that the electronic device 202 is continuing to use a media content 220 stream or transfer.

The content duration factor 336k may indicate how long a piece of media content 220 is anticipated to last. For example, assume that the source type 336i indicates that the paused media content 220 is an Internet radio broadcast. The content duration 336k factor may indicate that the current paused song is supposed to last a certain number of additional minutes or until a set time. If the multimedia content 220 is paused after the current song ends, it may be assumed that the particular song that the user was interested in has already ended, possibly indicating that the user is no longer interested in the media content 220, since it has expired. The content duration factor 336k may also indicate the amount of presentation time remaining for paused multimedia content 220. For example, if the remaining amount of presentation time for paused multimedia content 220 would require more power resources than are remaining (e.g., according to the power resources remaining factor 336c), the electronic device 202 may perform certain resource management operations 338.

The content format factor 336l may indicate the format of the media content 220. For example, the media content 220 may be a data file or stream of a particular format. Some content formats include Moving Picture Experts Group-1 (MPEG-1) Audio Layer 3 (MP3), Windows Media Video (WMV), QuickTime file format (MOV), Advanced Audio Coding (AAC) and Waveform Audio File Format (WAV), etc. The content format factor 336l may be relevant to resource management in that the amount of processing needed to decode the media content 220 may vary depending on the format. For example, one file format may require more processing (and hence more power) to decode than another file format.

The communication configuration factor 336m may indicate the kind of communications, if any, used between the electronic device 202 and the remote electronic device 224 and/or between the electronic device 202 and the locally networked electronic device 228 (e.g., to communicate, to transfer the media content 220, etc.). Depending on the communication configuration, it may cost more or less resources 218, 226, 230 to transfer and present multimedia content 220. For example, if the communication configuration 336m between the electronic device 202 and the remote electronic device 224 is wireless and the wireless signal is currently weak (e.g., requiring more power) or has a high error rate (e.g., requiring more processing for longer error correction schemes), local 218 and remote 226 resources may be consumed more quickly. In another communication configuration 336m, the multimedia content 220c may be transferred from the locally networked electronic device 228 to the electronic device 202 via a power-efficient wired connection. In that case, less power may be required to transfer the (paused) multimedia content 220c.

Processor usage 336n, memory usage 336o and power usage 336p may be additional or alternative resource management factors 336. Processor usage 336n may indicate the amount of processing resources being consumed by paused multimedia content 220. Memory usage 336o may indicate the amount of memory resources being used by paused multimedia content 220. Power usage 336p may indicate the amount of power resources being consumed by paused multimedia content 220. Other factors 336q may also be used. For example, communication bandwidth resources and network resources, etc. may be taken into account.

In the configuration illustrated in FIG. 3, the resource management operations 338 include operations such as a user prompt operation 338a, a terminate application operation 338b, a discontinue decoding operation 338c, an allow standby operation 338d, a notify remote device(s) operation 338e, a notify locally networked device(s) operation 338f, a cache processed data operation 338g and other operation(s) 338h. Additional or alternative resource management operations 338 may be used. For example, a communications channel may be terminated, decoding may be slowed but not stopped, display brightness may be reduced, etc.

The user prompt operation 338a may notify a user that multimedia content 220 is paused. For example, if a user has left multimedia content paused for 10 minutes, the electronic device 202 may display a message notifying the user of the paused multimedia content 220. The terminate application 338b operation may close a multimedia player 204 application, for example. The discontinue decoding operation 338c may stop a multimedia content 220 decoding process. The allow standby operation 338d may enable the electronic device 102, the locally networked electronic device 228 and/or the remote electronic device 224 to enter a standby or hibernate mode. For example, an electronic device 202 may not typically enter a standby mode when it considers the multimedia player 204 to be "active." The allow standby operation 338d may put the multimedia player 204 into an "inactive" status or otherwise permit one or more of the electronic devices 202, 224, 228 to enter a standby, hibernate or sleep mode.

The notify remote device(s) operation 338e may notify one or more remote devices 224 that the electronic device 202 is not currently using the multimedia content 220b from the remote device(s) 224. In one configuration, the notify remote device(s) operation 338e terminates a session with a remote electronic device 224. The notify locally networked device(s) operation 338f may notify one or more locally networked devices 228 that the electronic device 202 is not currently using the multimedia content 220. For example, the notify locally networked device(s) operation 338f may notify a locally networked electronic device 228 that the electronic device 202 is not using its 228 multimedia content 220c or that the locally networked electronic device 228 should not continue multimedia content 220c processes (e.g., sending, buffering, displaying, allocating resources for the multimedia content 220, etc.).

The cache processed data operation 338g may cache processed multimedia content 220 data. In some configurations, the electronic device 202 performs multimedia content 220 data processing while the multimedia player 204 is paused. For example, the electronic device 202 may continue buffering, decoding, receiving, performing error correction on, formatting or performing other operations on the multimedia content 220 data. It may be beneficial for the electronic device 202 to cache the processed data on the electronic device 202, locally networked electronic device 228 and/or the remote electronic device 224 in anticipation of future use, particularly for resumption of multimedia content 220 presentation after a prolonged pause operation 212 where resources being used to present the multimedia content 220 have been released. Other (e.g., additional or alternative) operation(s) 338h may be used.

Figure 4:
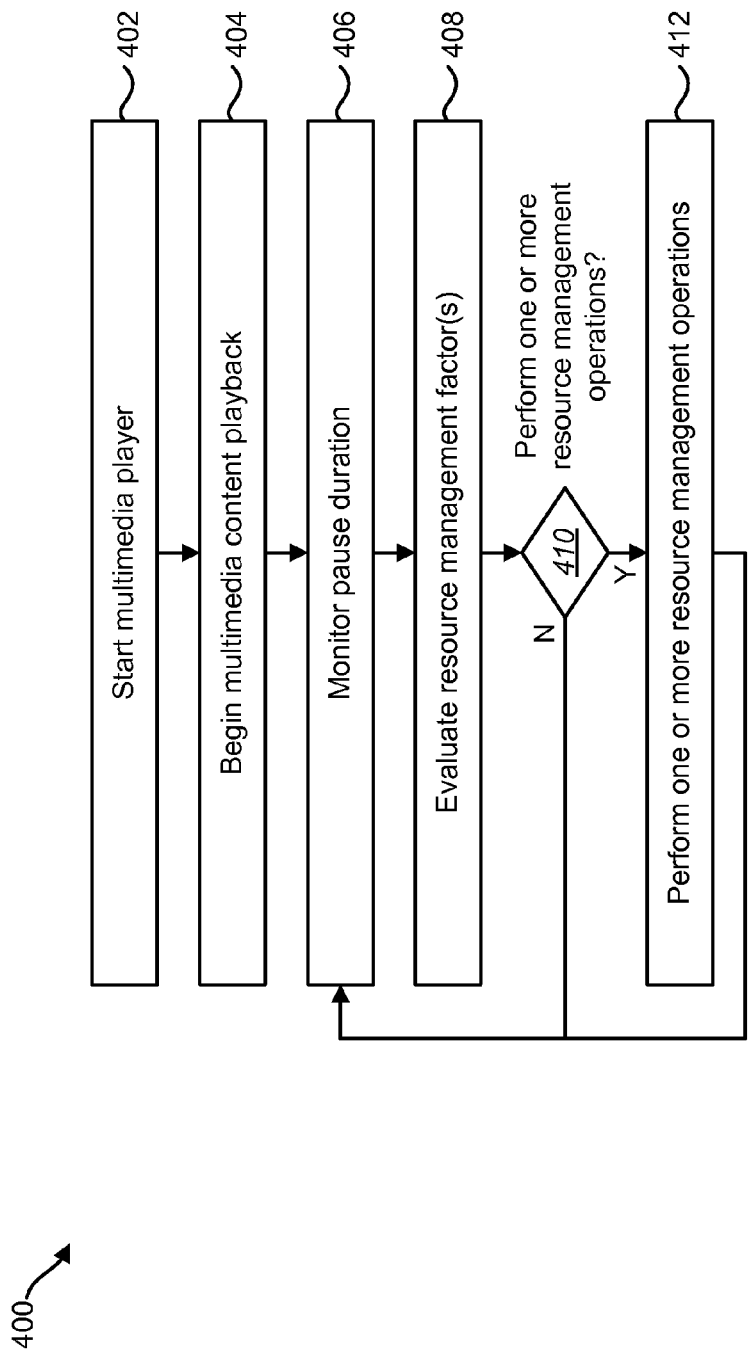
FIG. 4 is a flow diagram illustrating one configuration of a method for using pause to manage resources.

FIG. 4 is a flow diagram illustrating one configuration of a method 400 for using pause to manage resources. An electronic device 102 may start 402 a multimedia player 104. For example, the electronic device 102 may open or start 402 a multimedia player 104 program. The electronic device 102 may begin 404 multimedia content playback. For instance, the multimedia player 104 may play (e.g., output) audio or video. An electronic device 102 may monitor 406 a pause 112 duration. For example, an electronic device 102 may detect whether and when a pause operation 112 is initiated on the multimedia player 104. In monitoring 406 the pause duration, the electronic device 102 may obtain or determine the duration of the pause operation 112 and/or whether it is ongoing.

The electronic device 102 may evaluate 408 one or more resource management factors. For example, the electronic device 102 may obtain and/or compute one or more resource management factors such as the resource management factors 336 illustrated in FIG. 3. For instance, the electronic device 102 may compute an estimate of the power resources remaining 336c (e.g., using temperature 336d as a factor) on the electronic device 102, determine whether any concurrent tasks 336e are running (and what the concurrent task(s) are) on the electronic device 102 and determine the media content source (e.g., content source 336b). The electronic device 102 may also obtain the pause duration 336a, which may have been determined earlier (e.g., in the pause operation monitoring 406). Depending on the implementation, the electronic device 102 may evaluate 408 alternative or additional resource management factors. In evaluating 408 resource management factor(s), further computation may be performed, depending on the configuration. Further detail on such a procedure is given below (e.g., see FIG. 7).

The electronic device 102 may determine 410 whether to perform one or more resource management operations. This determination 410 may be based on the one or more resource management factors evaluated 408. Continuing with the above example, the electronic device 102 may base this determination, for instance, on the remaining power resources, the concurrent task(s) and the media content source. Assume in one case, the remaining power resources are high (e.g., a battery with a near-full charge), no concurrent tasks are running, the media content 112 is stored in local memory and the pause duration is five minutes. In this case, the electronic device 102 may determine 410 not to perform any resource management operations. This may be because the pause operation 112 is not consuming many resources, plenty of battery power remains, and no concurrent tasks are running. If the electronic device 102 determines 410 not to perform one or more resource management operations, the electronic device may return to monitoring 406 the pause duration.

Assume that in another case, only a 20% battery charge is remaining, a phone call is ongoing on the electronic device 102, the media content 112 is being streamed from a remote server and the pause duration has been an hour. In this case, the electronic device 102 may determine 410 that one or more resource management operations should be performed. For instance, the electronic device 102 may determine 410 that the remote server should be notified and the multimedia player 104 application should be terminated. If the electronic device 102 determines 410 that one or more resource management operations should be performed, the electronic device 102 may perform 412 the one or more resource management operations. Continuing the example, the electronic device 102 may send a message to the remote server indicating that the electronic device 102 will no longer stream the multimedia content 112. This may allow the remote server to release resources for other tasks, thereby conserving remote resources 226. The electronic device 102 may also terminate the multimedia player 104 application. Thus, receiving the multimedia content 120, decoding it 120 and dedicating memory for it 120 on the electronic device 102 may be discontinued, thereby conserving local resources 118.

Figure 5:
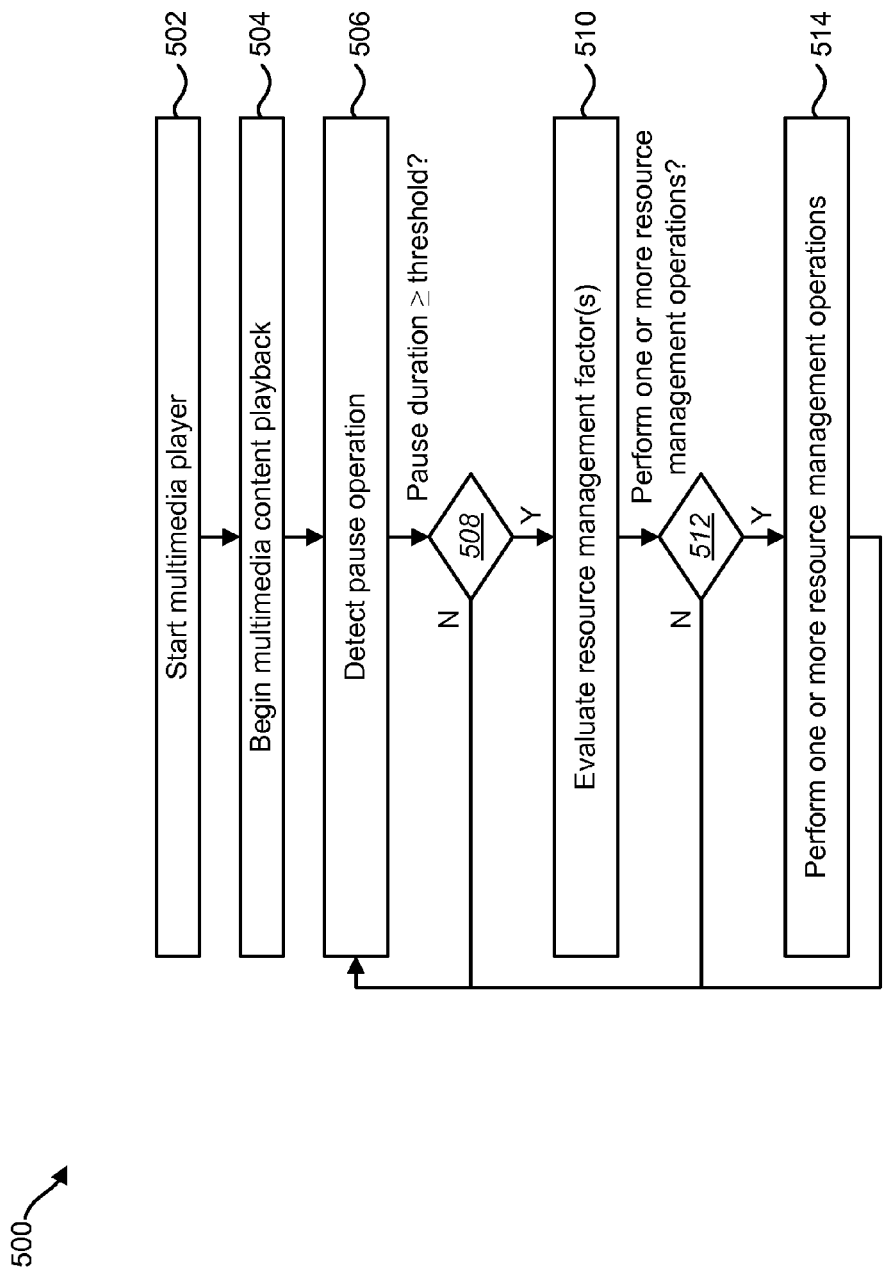
FIG. 5 is a flow diagram illustrating a more specific configuration of a method for using pause to manage resources.

FIG. 5 is a flow diagram illustrating a more specific configuration of a method 500 for using pause to manage resources. An electronic device 202 may start 502 a multimedia player 204. For example, the electronic device 202 may open or start 502 a multimedia player 204 program. The electronic device 202 may begin 504 multimedia content 220 playback. For instance, the multimedia player 204 may play (e.g., output) audio or video. The electronic device 202 may detect 506 a pause operation 212. For example, the resource management module 216 may monitor the multimedia player 204 for activation of the pause operation 212. In one configuration, the resource management module 216 may monitor multimedia player 204 software for the occurrence of an event indicating activation of the pause operation 212. For instance, the resource management module 216 may capture a pause control event, indicating that the pause operation 212 has been activated. Other approaches for detecting 506 a pause operation 212 may be used. When the electronic device 202 detects 506 a pause operation 212, it 202 may begin a timer or store the time of the initial pause 212 activation to be used for determining pause duration.

The electronic device 202 may determine 508 whether the pause duration is greater than or equal to one or more pause duration thresholds (e.g., pause duration thresholds 332). If the pause duration is not greater than or equal to the one or more pause duration thresholds, the electronic device 202 may return to detecting 506 a pause operation 212. If the electronic device 202 determines 508 that the pause duration is greater than or equal to one or more pause duration thresholds, the electronic device 202 may evaluate 510 one or more resource management factors. For example, the electronic device 202 may obtain or compute one or more resource management factors such as pause duration, content source, power resources remaining and concurrent task(s). A pause duration 336a may have been determined earlier during pause operation detection 506. The content source 336b may be obtained, for example, by querying multimedia player 204 software for the address of the current multimedia content 220. Obtaining the power resources remaining 336c may be accomplished, for example, by querying the OS of the electronic device 202 or by computing it 336c based on a number of possible factors (e.g., temperature, battery charge remaining, whether the electronic device 202 is plugged into a power outlet, etc.). In the case where the power resources remaining 336c factor is based on the remaining power resources on a distant electronic device (e.g., remote electronic device 224 and/or locally networked electronic device 228), the electronic device 202 may send a message to the distant electronic device requesting the remaining power resources or data (e.g., factors) from which it 336c may be computed.

A device temperature (e.g., temperature 336d) may be obtained using a thermal sensor included on the electronic device 202. Alternatively or additionally, the electronic device 202 may request the temperature of the remote electronic device 224 or the locally networked electronic device 228. A user behavior factor (e.g., user behavior 336f) may be obtained by maintaining a record of a user's behavior. For example, the electronic device 202 may store an average phone call duration (e.g., for all phone numbers, individual phone numbers and/or categories of phone numbers), an average application usage time (e.g., for each application, groups of applications and/or all applications collectively), an average pause duration, whether the user typically finishes consuming the multimedia content 220 after a pause, etc. Other user behaviors that are relevant to managing resources may be determined and/or stored.

A user requirements factor (e.g., user requirements 336g) may also be obtained. For example, the electronic device 202 may allow the user to input certain preferences or settings. For instance, the electronic device 202 may allow the user to set one or more thresholds (e.g., thresholds 332) and corresponding resource management operations (e.g., resource management operations 338). In one case, a user might set a 5 minute pause duration threshold 332 and a corresponding user prompt 338a operation. The term "user" may indicate an actual end user of the electronic device 202 or an electronic device 202 manufacturer, service provider, etc.

A continued operation expectation (e.g., continued operation expectation 336h) may be obtained during evaluation 510. For example, the continued operation expectation 336h may indicate situations where a particular user or users may expect continued operation even after an extended pause duration. For instance, a user may pause multimedia content 220 in order to allow it 220 to fully buffer or download before consuming it 220. These situations may be dependent on certain factors such as content source 336b, content duration 336k and other factors, for example.

During evaluation 510, a source type (e.g., source type 336i) may also be obtained or determined. For example, an electronic device 202 may maintain a record of network addresses, multimedia content 220 of a certain content format 336l and/or whether the content source 336b attempts distant acknowledgement 336j to determine a source type. Examples of source types include Internet radio, multimedia content 220 broadcast, pay-per-view or metered multimedia content 220, etc. Of course, the source type may indicate other typical source types such as a file download, stream, etc.

Whether distant acknowledgement (e.g., distant acknowledgement 336j) is attempted may be obtained or determined during evaluation 510. For example, the electronic device 202 (e.g., resource management module 216) may detect whether a distant device (e.g., remote electronic device 224, locally networked electronic device 228) is sending messages that request acknowledgment.

During evaluation 510, the electronic device (e.g., resource management module 216) may obtain or determine a content duration (e.g., content duration 336k). For example, the resource management module 216 may query the multimedia player 204 for the duration of the media content 220 that is currently paused. Additionally or alternatively, the resource management module 216 may determine a content duration based on the size of the multimedia content 220 (e.g., file size), the content format 336l and/or multimedia content 220 metadata, for example.

A content format may be obtained or determined during evaluation 510. The electronic device 202 (e.g., resource management module 216) may obtain the content format (e.g., content format 336l) by querying the multimedia player 204 for the format of the multimedia content 220. Alternatively or in addition, the electronic device 202 may monitor hardware or network addresses (e.g., file names, IP addresses, etc.) of content requests made by the multimedia player 204 in order to determine the content format.

During evaluation 510, the electronic device (e.g., resource management module 216) may obtain or determine a communication configuration (e.g., communication configuration 336m). For example, if the multimedia content 220 is being obtained distantly (e.g., from a remote electronic device 224 and/or a locally networked electronic device 228), the resource management module 216 may determine the communication configuration 336m being used to obtain the multimedia content 220. For instance, the resource management module 216 may determine whether a wired or wireless link is being used and which accompanying protocols are being used. Furthermore, the resource management module 216 may determine a communication configuration status. For instance, assuming that a wireless communication link is being used, the resource management module 216 may determine signal strength, what kind of modulation and error correction/detection coding are being used, etc. Thus, the communication configuration (e.g., communication configuration 336m) may give the electronic device 202 an indication of the amount of local resources 218, remote resources 226, locally networked resources 230 and/or other resources (e.g., base station communication bandwidth, processing and/or power resources, etc.) being consumed by paused multimedia content 220.

In general, evaluating 510 one or more resource management factors may allow the electronic device 202 to obtain information that is relevant to determine if performing 514 one or more resource management operations would be beneficial to save resources while preserving end users' expectation of continued operation.

The electronic device 202 may determine 512 whether to perform one or more resource management operations. In making this determination 512, the electronic device 202 may determine if and which of one or more resource management operations should be performed. This determination 512 may be based on one or more of the resource management factors evaluated 510. Several approaches may be used to make this determination 512. If the electronic device 202 (e.g., resource management module 216) determines 512 that no resource management operations should be performed, the electronic device 202 may return to detecting 506 pause operations 212. If the electronic device 202 determines 512 that one or more resource management operations should be performed, the electronic device 202 may perform 514 one or more resource management operations and return to detecting 506 a pause operation.

Figure 6:
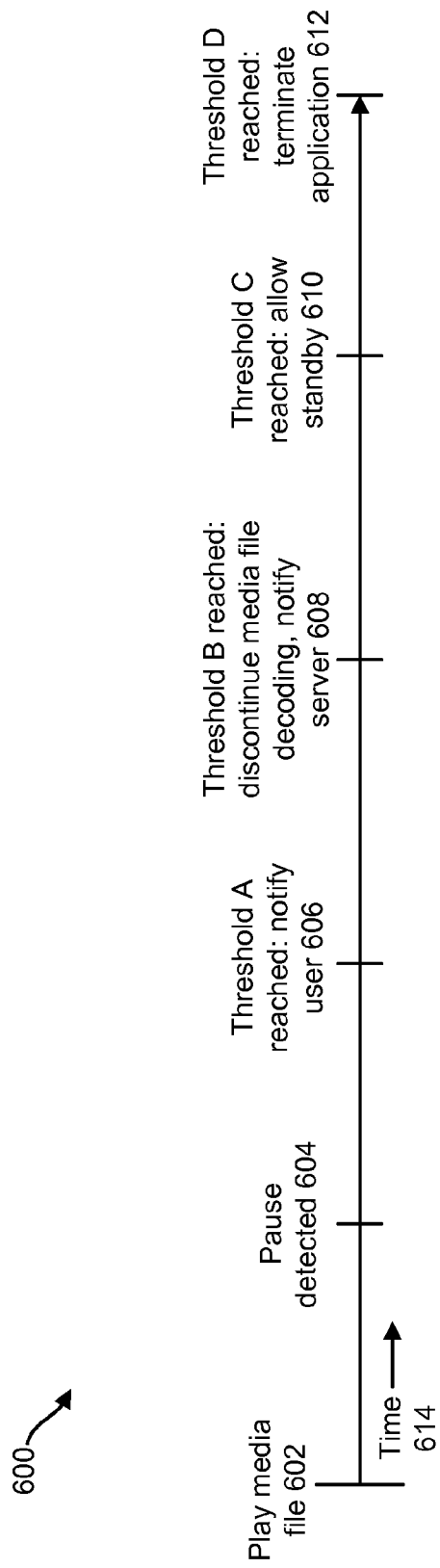
FIG. 6 is a diagram illustrating a timeline of one example of using pause to manage resources.

FIG. 6 is a diagram illustrating a timeline 614 of one example 600 of using pause to manage resources. More specifically, FIG. 6 illustrates progressively releasing resources or deconstructing a multimedia ecosystem based on pause duration. In this example, an electronic device 202 plays 602 a media file (e.g., multimedia content 220) using a multimedia player 204. After the media file has been playing for a time, the resource management module 216 detects 604 a pause operation 212. The resource management module 216 monitors the pause duration. The pause operation 212 continues when threshold A is reached 606. The resource management module 216 evaluates one or more resource management factors 336 and determines that it 216 should perform a user prompt operation 338a. Thus, the resource management module 216 displays or outputs a notification (e.g., an audible sound and/or a visual display on the electronic device 202) to the user that the multimedia player 204 has been paused for an amount of time. In one configuration, the user prompt operation 338a may query the user whether the user wants the pause operation 212 to continue or if the multimedia player 204 can be terminated.

In this example, the pause operation 212 continues when pause duration threshold B is reached 608. At this point, the one or more resource management factors 336 are again evaluated. Based on the one or more resource management factors 336, the resource management module 216 determines that media file decoding should be discontinued (e.g., the discontinue decoding operation 338c should be performed). Thus, the electronic device 202 stops the multimedia file decoding process. The resource management module 216 also determines that a remote server (e.g., remote electronic device 224) should be notified (e.g., that the notify remote device(s) operation 338e should be performed). The resource management module 216 sends a message to the remote electronic device 224 that is providing the multimedia content 220b to terminate its session.

The pause operation 212 continues when threshold C is reached 610. The resource management module 216 again evaluates one or more resource management factors 336 and determines that standby should be allowed. That is, the resource management module 216 determines that the allow standby 338d operation should be performed. The resource management module 216 designates the multimedia player 204 as being inactive. The electronic device 202 may go into standby or hibernate mode based on the activity of the multimedia player 204 and other applications.

In this example, the pause operation 212 continues until threshold D is reached 612. When threshold D is reached 612, the resource management module 216 evaluates the one or more resource management factors 336 and determines that the multimedia player 204 application should be dismissed (e.g., the terminate application operation 338b should be performed). The electronic device 202 closes the multimedia player 204 application. Thus, according to the example illustrated in FIG. 6, resources may be progressively released depending on pause duration. In other words, the multimedia ecosystem may be progressively deconstructed as a pause operation 212 continues.

Figure 7:
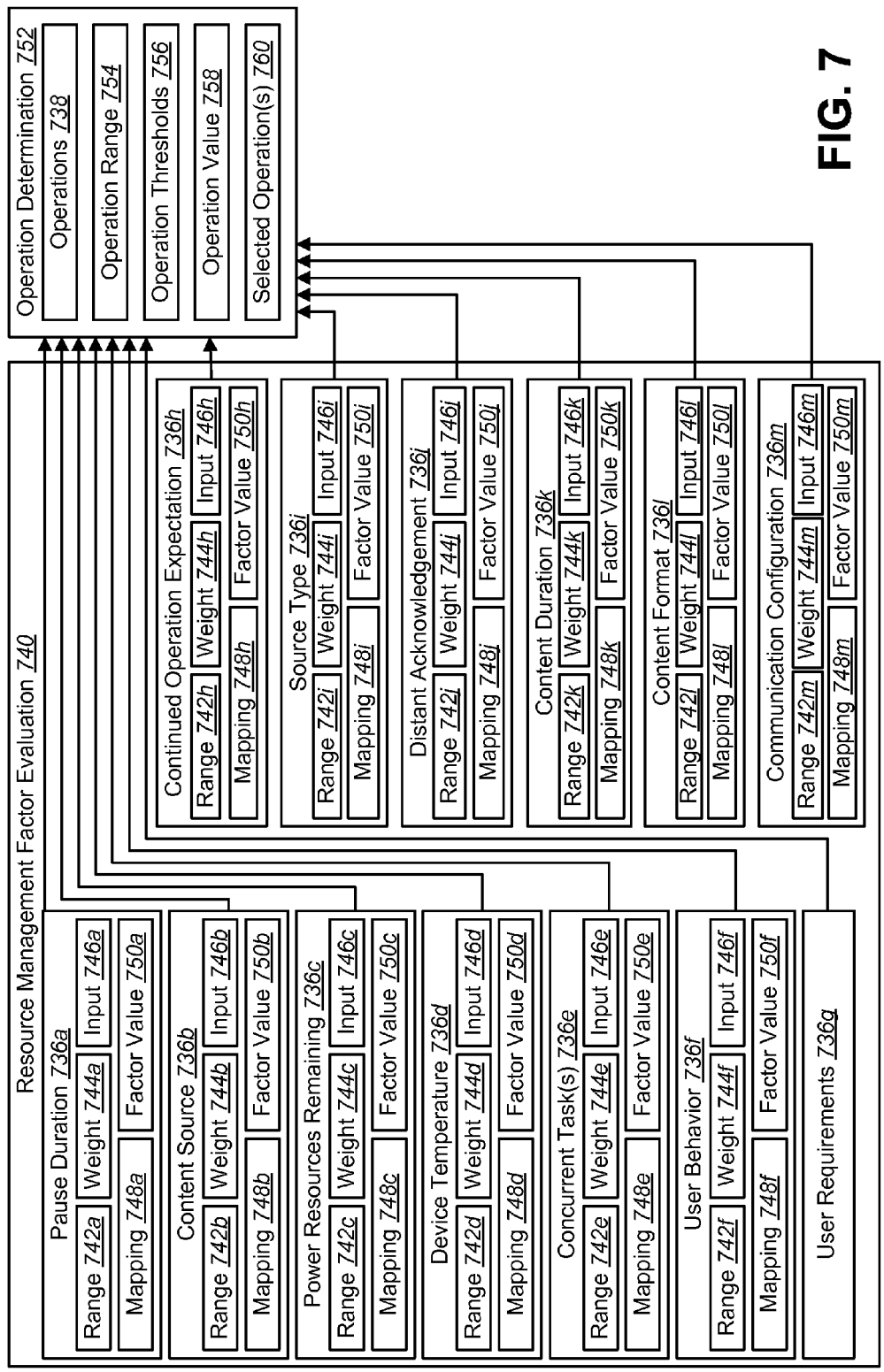
FIG. 7 is a block diagram illustrating one configuration of a resource management factor evaluation module and an operation determination module.

FIG. 7 is a block diagram illustrating one configuration of a resource management factor evaluation module 740 and an operation determination module 752. In this example, a resource management factor evaluation module 740 uses several resource management factors 736a-m. More specifically, pause duration 736a, content source 736b, power resources remaining 736c, device temperature 736d, concurrent task(s) 736e, user behavior 736f, user requirements 736g, continued operation expectation 736h, source type 736i, distant acknowledgement 736j, content duration 736k, content format 736l and communication configuration 736m may be evaluated.

Each of the resource management factors 736a-f, 736h-m (except user requirements 736g) may include a respective range 742a-f, 742h-m, weight 744a-f, 744h-m, input 746a-f, 746h-m, mapping 748a-f, 748h-m and factor value 750a-f, 750h-m. The range 742 may be a given range of numbers for each factor 736. In general, the range 742 may represent a scale where lower numbers represent less resource consumption and higher numbers represent more resource consumption (or waste, for example). The inputs 746 may represent inputs or values obtained that are relevant to each resource management factor 736. For example, the pause duration 736a input 746a may be an amount of time, whereas a device temperature 736d input 746d may be a temperature in degrees Fahrenheit. Each mapping 748 may map one or more inputs 746 to a range 742. For example, a pause duration 736a input 746a of 5 minutes may be mapped 748a to a 1 in the range 742a whereas a day may be mapped to a 10, etc.

Each weight 744 may represent a multiplicative factor used to weight how much value each resource management factor 736 affects operation determination 752. For example, if a concurrent task 736e is considered particularly important (e.g., a 911 call) in an operation determination 752, it 736e may be given a greater weight 744e than a content format 736l. Weights 744 may also be adjusted based on other factors. For example, if the power resources remaining 736c input 746c indicates that unlimited power resources are available, the weights 744a-f, 744h-m may be set to 0 or very low, since preserving local resources may be unimportant. In another example, if the concurrent task(s) 736e input 746e indicates that a 911 call is a concurrent task, the weights 744a-f, 744h-m may be set very high, since the costs of paused multimedia content 220 in that context are very high. In yet another example, if a source type 736i input 746i indicates that the source is a streaming broadcast source (e.g., without an ability to consume media content 220 older than a particular age), the content duration factor 736k may be given a greater weight 744k. For instance, if the content duration 736k input indicates that the song the user was listening to when it was paused is 5 minutes long, the source type input 746i indicates that the source type is broadcast streaming and the pause duration 736a input 746a indicates that the stream has been paused for 20 minutes, the content duration factor 736k may be given greater weight 744k since the song the user was interested in is over and probably unrecoverable.

The factor value 750 for each resource management factor 736 may be a numerical value that is computed for use in the operation determination 752. For example, the factor value 750 for each resource management factor 736 (except user requirements 736g) may be computed according to an equation in the form of Equation (1).

$$\text{factor\_value} = w_{factor} * \text{Range}_{mapping}(\text{input}) \quad (1)$$

In Equation (1), factor_value is the resource management factor value 750 used for operation determination 752. $w_{factor}$ is the weight 744 assigned to the resource management factor 736. $\text{Range}_{mapping}( )$ is a function that maps an input 746 into a range 742 value. $\text{Range}_{mapping}( )$ may use a single scale, a scale with multiple regions and/or multiple separate or overlapping scales. Moreover, several inputs 746 may be mapped to a single range 742 value, depending on the implementation.

Brief examples of the resource management factors 736a-f, 736h-m are given as follows. The pause duration range 742a may represent a scale from a short pause duration to a long pause duration. In one configuration, the pause duration range 742a may be a scale from 0 to 10, where 0 represents no (or short) pause duration and 10 represents extremely long pause duration. The content source 736b range 742b may range from local, to locally networked, to remote content sources, since the more distant content is, the more resources it may require to present the content (generally). The power resources remaining 736c range 742c may range from unlimited to none. For instance, 0 may represent unlimited power resources (e.g., the electronic device 202 is plugged into a wall outlet) and 10 may represent no remaining power resources (e.g., the battery is dead).

The device temperature 736d range 742d may range from optimum operating temperature to poor operating temperature. For example, a battery on an electronic device 202 may operate at optimum efficiency at a particular temperature. However, as the battery becomes hotter or colder than the optimum temperature, battery performance may decrease, which may be more costly in terms of resources. The concurrent task(s) 736e range 742e may range from non-critical and/or inexpensive (in terms of resources) concurrent tasks to critical and/or costly (in terms of resources) tasks. For example, a critical task may be a 911 phone call, where paused multimedia presentation should almost always be discontinued. A non-critical task may be a background task on the electronic device, such as an asynchronous weather report update application.

The user behavior 736f range 742f may range from user behaviors that tend to use fewer resources to user behaviors that tend to use a lot of resources. For example, opening a large number of concurrent applications where only one is being used may use a lot of resources unnecessarily. Many other user behaviors may be used. The continued operation expectation 736h range 742h may range from a high expectation to a low expectation of continued operation. For example, a user will probably not expect to resume playing a video that he paused three days ago. On the other hand, the user may highly expect to resume playing a song that he paused to await downloading or buffering 10 minutes ago.

The source type 736i range 742i may range from a multimedia content 220 source that is free to access to a multimedia content 220 source that is costly (e.g., time-metered). For example, paused multimedia content 220 may cost fewer resources (monetarily and otherwise) for free access compared to multimedia content 220 where the user is charged for the amount of time a session or link is maintained in the user's behalf. In another example, the source type 736*i* range 742*i* may range from a dedicated source to a broadcast source. For example, a dedicated source may be more worth maintaining in pause, since the user may resume the multimedia content 220 where it was suspended. However, a broadcast source may quickly deteriorate in value, since the media content 220 of interest may expire. Hence, a broadcast source may be more "expensive" to maintain in pause. A distant acknowledgement 736*j* range 742*j* may range from no acknowledgment attempts to frequent acknowledgement attempts. For example, resources and/or metering may not be a concern for a remote server that does not attempt acknowledgment. However, resources and/or metering may be a big concern for a remote server that attempts frequent acknowledgement. For instance, a remote server that attempts frequent acknowledgement may be time-metering sessions in order to charge for access or quickly dispose of inactive sessions (e.g., in order to free bandwidth for other sessions).

The content duration 736*k* range 742*k* may range from content that is still of interest to content that is no longer of interest. Additionally or alternatively, the content duration 736*k* range 742*k* may range from a multimedia content 220 duration that may be easily presented within current resource limits to a multimedia content 220 duration that will not be able to be presented within current resource limits. For example, the electronic device 202 may be able to present a 5-minute song with a full battery charge, but may not be able to present a 3-hour high-definition movie with 5 minutes of battery charge remaining.

The content format 736*l* range 742*l* may range from those content formats that are inexpensive (in terms of resources) to present to content formats that are extremely expensive to present. For example, one kind of video file (e.g., a native format video file) may be much less expensive to decode and present than a complicated foreign-format video file.

The communication configuration 736*m* range 742*m* may range from inexpensive (in terms of resources) configurations to expensive configurations. For example, a wired link or connection using simple protocols may be much less costly in terms of resources for receiving multimedia content 220 than a wireless link or connection using complex protocols. Additionally or alternatively, the communication configuration 736*m* range 742*m* may range from a strong signal (requiring no additional gain and/or error correction) to a weak signal requiring additional gain and/or additional error protection processing and signaling.

The operation determination module 752 may determine if and which operations 738 to perform based on the resource management factors 736. More specifically, the operation determination module 752 may use the resource management factor values 750*a-f*, 750*h-m* and the user requirements 736*g* to determine whether any resource management operations 738 should be performed and if so, which resource management operations 738 should be performed. The operation determination module 752 may include resource management operations 738, an operation range 754, one or more operation thresholds 756, an operation value 758 and one or more selected operations 760. The operation range 754 may be a range of numerical values that may be used to determine which operations 738 should be performed. The operation range 754 may cover the entire range of possible combinations of factor values 750*a-f*, 750*h-m*. The one or more operation thresholds 756 may be numerical values within the operation range 754 that provide regions or boundaries used to select certain operations 738. The operation value 758 may be a combination of the factor values 750*a-f*, 750*h-m* used to determine which operations 738, if any, to perform.

For example, the operation range 754 may be a range between 0 and 500. Assume, for the sake of example, that four operation thresholds 756 are given, one each at 100, 200, 300 and 400. The operation thresholds 756 may dictate that for an operation value <100, no operations 738 will be performed; for operation values ≥100, the user will be prompted; for operation values ≥200, media content decoding will be discontinued and a remote server will be notified (if applicable); for operation values ≥300, standby will be allowed and for operation values ≥400, the multimedia player 204 application will be terminated. Thus, the one or more selected operations 760 may be determined based on the operation range 754, the operation thresholds 756 (with their associated operations 738) and the operation value 758. The user requirements 736*g* may be used to adjust operation thresholds 756 and their associated operations 738. As can be seen from the example given in FIG. 7, the systems and methods herein may allow a simple approach based on only one resource management factor 736 (e.g., a pause duration 736*a*) for determining one or more selected operations 760 to a more complex approach using many resource management factors 736.

Figure 8:
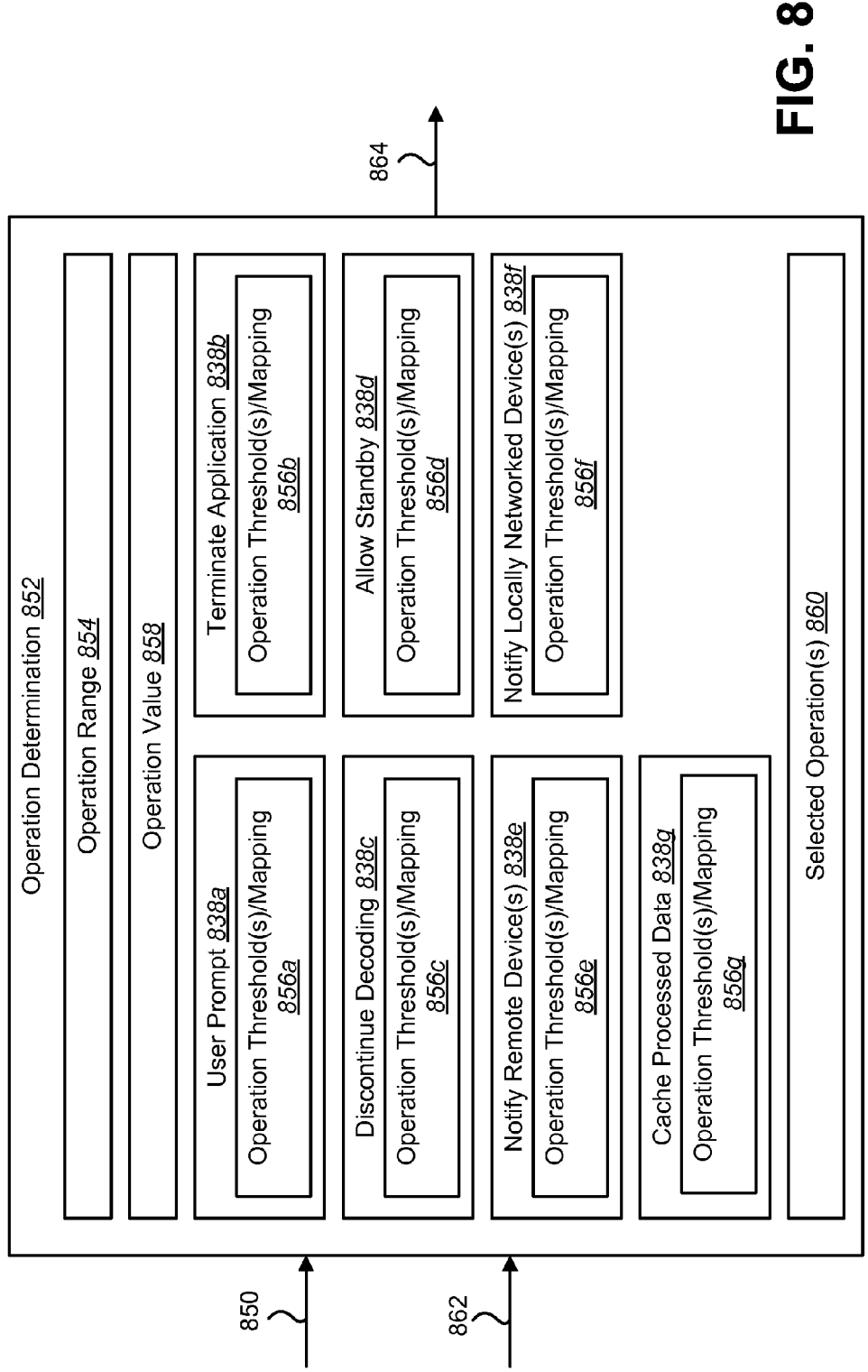
FIG. 8 is a block diagram illustrating one configuration of an operation determination module.

FIG. 8 is a block diagram illustrating one configuration of an operation determination module 852. The operation determination module 852 may include an operation range 854, an operation value 858, one or more operations 838*a-g* and one or more selected operations 860. The operation determination module 852 may receive one or more factor values 850 and/or user requirements 862. The operation determination module 852 may compute the operation value using the one or more factor values 850. For example, the operation value 858 may be computed as illustrated in Equation (2).

$$\text{operation\_value} = \sum_{index=1}^{n} \text{factor\_value}_{index} \qquad (2)$$

In Equation (2), operation_value is the operation value 858, index is an index number for the factor values 850, n is the total number of factor values 850 considered and factor_value represents a factor value 850 at each index. The factor values 850 may be summed to yield the operation value 858. The operation range 854 may be a range of numbers between a minimum operation value 858 and a maximum operation value 858.

Each of the resource management operations 838*a-g* may include one or more operation thresholds or mapping 856*a-g*. Each of the operation threshold(s)/mapping 856 designates one or more values or one or more ranges of values within the operation range 854. For example, the operation threshold(s)/mapping 856 may designate a range greater than a number, greater than or equal to a number, less than a number, less than or equal to a number or any combination (e.g., ≥threshold$_1$ and ≤threshold$_2$, etc.). If the operation value 858 is within that value or range of values designated by the operation threshold(s)/mapping 856, the corresponding resource management operation or operations 838 are selected, thereby becoming the selected operation(s) 860. The selected operation(s) 860 may be provided 864 to the electronic device 202, which executes the selected operation(s) 860.

For the sake of example, assume that the operation range is from 0 to 500. Assume that the user prompt operation 838*a* has a threshold 856*a* threshold$_a$≥100, the discontinue decoding operation 838*c* has a threshold 856*c* threshold$_c$≥200, the cache processed data operation 838*g* has a threshold 856*g* threshold$_g$≥200, the notify remote device(s) operation 838*e* has a threshold 856*e* threshold$_e$≥300, the notify locally networked devices operation 838f has a threshold 856f threshold$_f$≥300, the allow standby operation 838d has a threshold 856d threshold$_d$≥350 and the terminate application operation 838b has a threshold 856b threshold$_b$≥500. Assume, for simplicity, that only a pause duration 736a factor value 750a will be input 850 into the operation determination module 852. Further assume that the pause duration factor 736a has a range 742a of 0 to 10, a weight 744a of 100 and a mapping 748a of 1 per 10 minutes input 746a. Also assume that the pause duration thresholds 332 occur at 5, 10, 20, 30, 40 and 50 minutes.

Assume that a video file (e.g., multimedia content 220b) is being downloaded and presented on the multimedia player 204 from a remote server (e.g., remote electronic device 224). The video presentation is then paused. At 5 minutes of pause duration, the first pause duration threshold 332 of 5 minutes is reached and the resource management factors (in this case, only the pause duration 736a) will be evaluated. Thus, the 5 minute input 746a of the pause duration 736a is mapped to 0.5 and given a weight 744a of 100, resulting in a factor value 750a of 50. The factor value 750a of 50 is input 850 into the operation determination module 852. 50 becomes the operation value 858, since there are no additional resource management factor values for summing (e.g., according to Equation (2)). The operation determination module 852 determines that none of the resource management operations 838a-g should be performed, since an operation value 858 of 50 does not satisfy or meet any thresholds 856a-g.

Assume that the pause operation 212 continues. At 10 minutes of pause duration, the second pause duration threshold 332 is reached, triggering evaluation 740 of the resource management factors 736. The pause duration input 746a is 10 minutes, which is mapped to 748a to a range 742a value of 1. Applying the weight 744a, the pause duration factor value 752a becomes 100, which is input 862 into the operation determination module 852. With no additional resource management factors 736, the operation value 858 becomes 100. The operation value 858 of 100 meets or satisfies only the user prompt operation 838a threshold 856a (e.g., threshold$_a$≥100). Thus, the user prompt operation 838a becomes a selected operation 860, which is provided 864 to the electronic device 202. At this point, the electronic device 202 displays or outputs a user notification or alert indicating that the multimedia player 204 has been paused for 10 minutes.

At 20 minutes of pause duration, the discontinue decoding operation 838c threshold 856c (e.g., threshold$_c$≥200) and the cache processed data operation 838g threshold 856g (e.g., threshold$_g$≥200) are reached, causing the discontinue decoding operation 838c and cache processed data operation 838g to become selected operations 860, which are provided 864 to the electronic device 102. Thus, the video file decoding is discontinued by the electronic device 202. It should be noted that the user prompt operation 838a threshold 856a (e.g., threshold$_a$≥100) is also met at this point. Depending on the configuration, the operation determination module 852 may again select the user prompt operation 838a or may not select the user prompt operation 838a since it has already been performed. In general, the resource management operations 838a-g may or may not be repeated depending on the configuration. Additionally, only certain resource management operations 838a-g may be repeated. For example, the user prompt operation 838a may be repeated every time its threshold 856a is satisfied, while the discontinue decoding operation 838c may only be performed once.

At 30 minutes of pause duration, the notify remote device(s) operation 838e threshold 856e (e.g., threshold$_e$≥300) is reached and the notify locally networked devices operation 838f threshold 856f (e.g., threshold$_f$≥300) is reached, since the operation value is 858 is 300. Thus, the notify remote device(s) operation 838e and the notify locally networked devices operation 838f are selected operations 860 provided 864 to the electronic device 202 for execution. However, in this case the video file is being provided only from the remote server (e.g., remote electronic device 224). Thus, only the remote server would be notified, since the notify locally networked device operation 838f is inapplicable.

At 40 minutes of pause duration, the allow standby operation 838d threshold 856d (e.g., threshold$_d$≥350) is met (with an operation value 858 of 400). Thus, the allow standby operation 838d is a selected operation 860 provided 864 to the electronic device 202 for execution. At 50 minutes of pause duration, the terminate application operation 838b threshold 856b (e.g., threshold$_b$≥500) is met (with an operation value 858 of 500). The terminate application operation 838b becomes a selected operation 860 that is provided 864 to the electronic device 202. Accordingly, the multimedia player 204 application is terminated or dismissed. It should be noted that a user may adjust operation thresholds/mappings 856a-g using the user requirements factor 736g input 862 into the operation determination module 852. For example, if the user did not want to be prompted (by the user prompt operation 838a) at 10 minutes, the user could adjust the operation threshold(s)/mapping 856a of the user prompt (using the user requirements factor 736g) to some other value (e.g., ≥50, ≥200, etc.).

As illustrated in this example, resource usage is progressively reduced (e.g., the multimedia ecosystem is progressively deconstructed) based on pause duration. As further illustrated, many other resource management factors 736 and/or operations 838 may be used according to the systems and methods herein.

Figure 9:
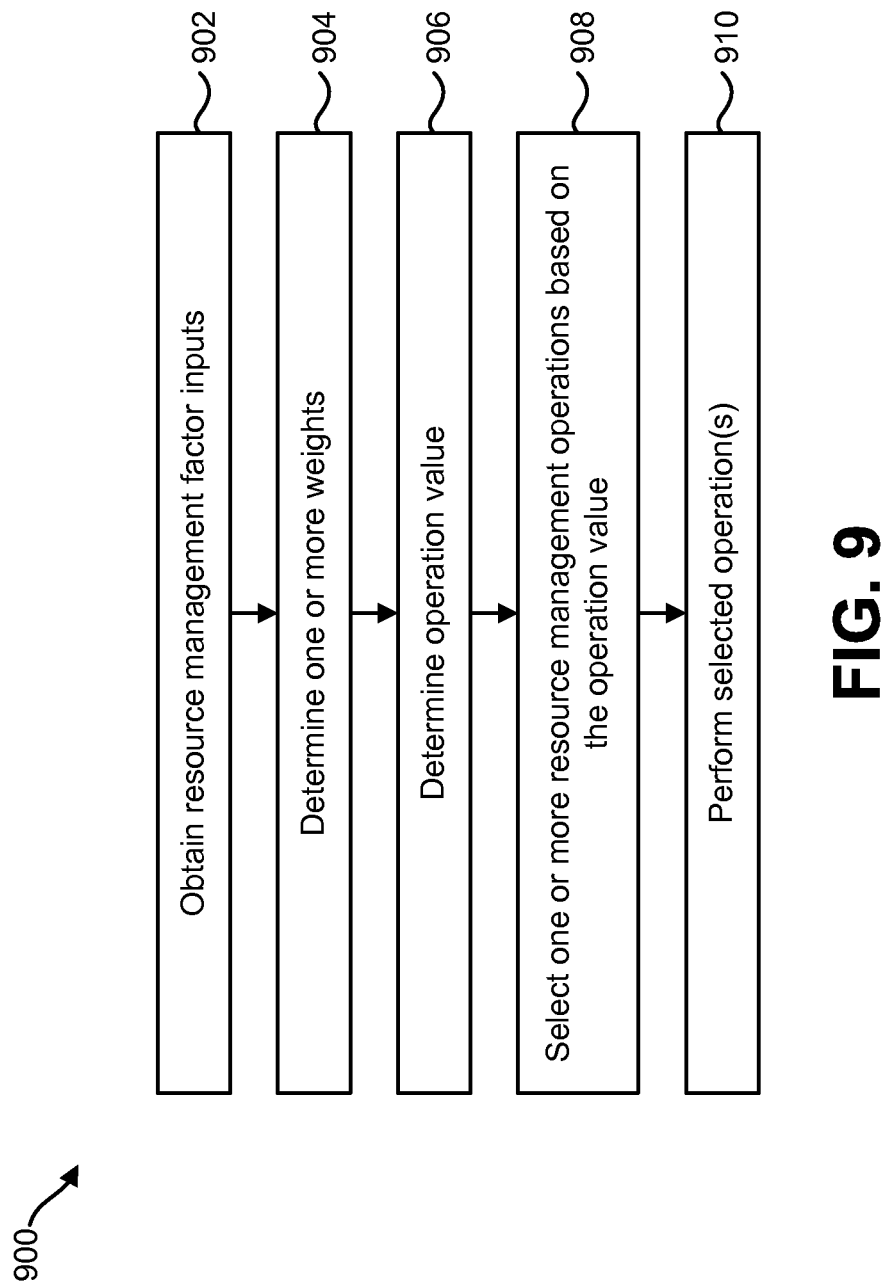
FIG. 9 is a flow diagram illustrating a more detailed configuration of a method for using pause to manage resources.

FIG. 9 is a flow diagram illustrating a more detailed configuration of a method 900 for using pause to manage resources. An electronic device 102 may obtain 902 resource management factor inputs. For example, the resource management module 116 may obtain an input 746a for a pause duration factor 736a. The electronic device 102 may determine 904 one or more weights. For example, the resource management module 116 may determine weights 744 based on one or more inputs 746 and/or user requirements 736g. The electronic device 102 may determine 906 an operation value. For example, the resource management module 116 may compute one or more factor values 750 and sum them to determine 906 the operation value 858.

The electronic device 102 may select 908 one or more resource management operations based on the operation value. For instance, the resource management module 116 may use the operation value 858 to determine whether one or more thresholds 856 of the resource management operations 838 are met, if any. The resource management operations 838 corresponding to the one or more thresholds that are met, if any, become the selected operations 860. However, one or more resource management operations 838 may not be selected or performed if they are inapplicable or should not be repeated (depending on user requirements 736g, for example). The electronic device 102 may then perform 910 the one or more selected operations, if any.

Figure 10:
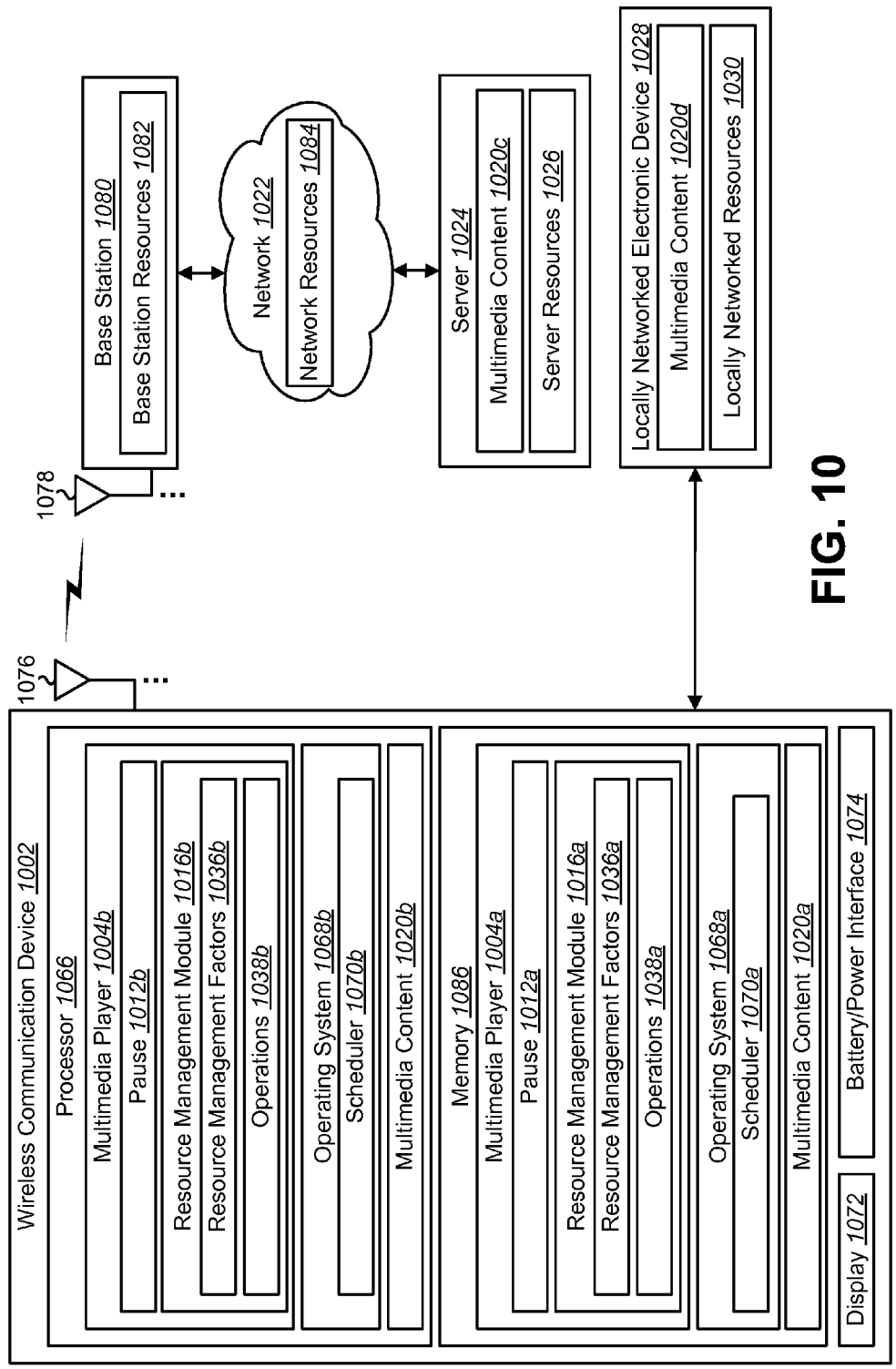
FIG. 10 is a block diagram illustrating one configuration of a wireless communication device in which systems and methods for using pause to manage resources may be implemented.

FIG. 10 is a block diagram illustrating one configuration of a wireless communication device 1002 in which systems and methods for using pause to manage resources may be implemented. The wireless communication device 1002 may be one kind of electronic device 102, 202 used for wirelessly communicating with other electronic devices (e.g., base station 1080, server 1024, locally networked electronic device 1028, etc.). The wireless communication device 1002 may include a processor 1066, memory 1086, a display 1072, a battery/power interface 1074 and one or more antennas 1076. The display 1072 may be used to display multimedia content 1020 to a user. The display 1072 may also serve as a user interface, depending on the configuration. The battery/power interface 1074 may be a battery and/or other devices for providing power to the wireless communication device 1002. For example, the battery/power interface 1074 may include a port used to connect another power source (e.g., wall outlet, car outlet, USB cable, etc.) to the wireless communication device 1002 for charging the battery 1074 and/or providing power to the wireless communication device 1002. The one or more antennas 1076 may be used by the wireless communication device 1002 to communicate with the base station 1080 using transmitted and/or received electromagnetic signals (e.g., including multimedia content 1020 data).

The memory 1086 may include (e.g., store) data and/or instructions comprising a multimedia player 1004a, an operating system (OS) 1068a and multimedia content 1020a. For example, the data and/or instructions for the multimedia player 1004a may also include data and/or instructions for a pause operation 1012a and a resource management module 1016a, including resource management factors 1036a and/or operations 1038a. The operating system 1068a in memory 1086 may include data and/or instructions for a scheduler 1070a. The scheduler 1070a may be used to schedule one or more processes and/or execution of instructions on the processor 1066.

The data and/or instructions (or parts of the data and/or instructions) stored in the memory 1086 may be loaded onto the processor 1066 for execution. For example, data and/or instructions for the multimedia player 1004b, including the pause operation 1012b and the resource management module 1016b with resource management factors 1036b and/or operations 1038b, may be loaded onto the processor 1066 for execution. Furthermore, data and/or instructions for the operating system (OS) 1068b, including a scheduler 1070b, may be loaded onto the processor 1066 for execution. Multimedia content data 1020b may also be loaded onto the processor 1066 for presentation or other processing.

The wireless communication device 1002 may communicate with a base station 1080. For example, the base station 1080 may receive signals from the wireless communication device 1002 and transmit signals to the wireless communication device 1002 using one or more antennas 1078. The base station 1080 may be coupled to a network 1022, which in turn may be coupled to a server 1024. The server 1024 may include multimedia content 1020c. The wireless communication device 1002 may access the multimedia content 1020c on the server 1024 using the base station 1080 and the network 1022. When the multimedia content 1020c on the server 1024 is accessed, server resources 1026 (e.g., processing resources, communication resources, memory resources, power resources, etc.) are consumed. Furthermore, network resources 1084 (e.g., processing resources, communication resources, memory resources such as a routing table, power resources, etc.) and base station resources 1082 (e.g., processing resources, communication resources such as time, frequency and spatial resources, memory resources, power resources, etc.) are consumed. In addition, wireless communication device 1002 resources (e.g., processor 1066, memory 1086, display, battery/power interface, etc.) are consumed.

The wireless communication device 1002 may communicate with a locally networked electronic device 1028. The wireless communication device 1002 may access and/or provide the multimedia content 1020d on the locally networked electronic device 1028. For example, the locally networked electronic device 1028 may be a Bluetooth display used for displaying multimedia content 1020d that is provided by the multimedia player 1004. When the multimedia content 1020d is accessed or provided, locally networked resources 1030 (e.g., processing, display, power, memory, etc.) are consumed.

In one configuration, one or more of the resource management factors 1036 are based on base station resources 1082, network resources 1084, server resources 1026 and/or locally networked resources 1030. Furthermore, one or more of the resource management operations 1038 may be used to control or manage base station resources 1082, network resources 1084, server resources 1026 and/or locally networked resources 1030. This may be done in addition to or alternatively from resource management factors 1036 and/or operations 1038 used to manage local resources on the wireless communication device 1002.

Figure 11:
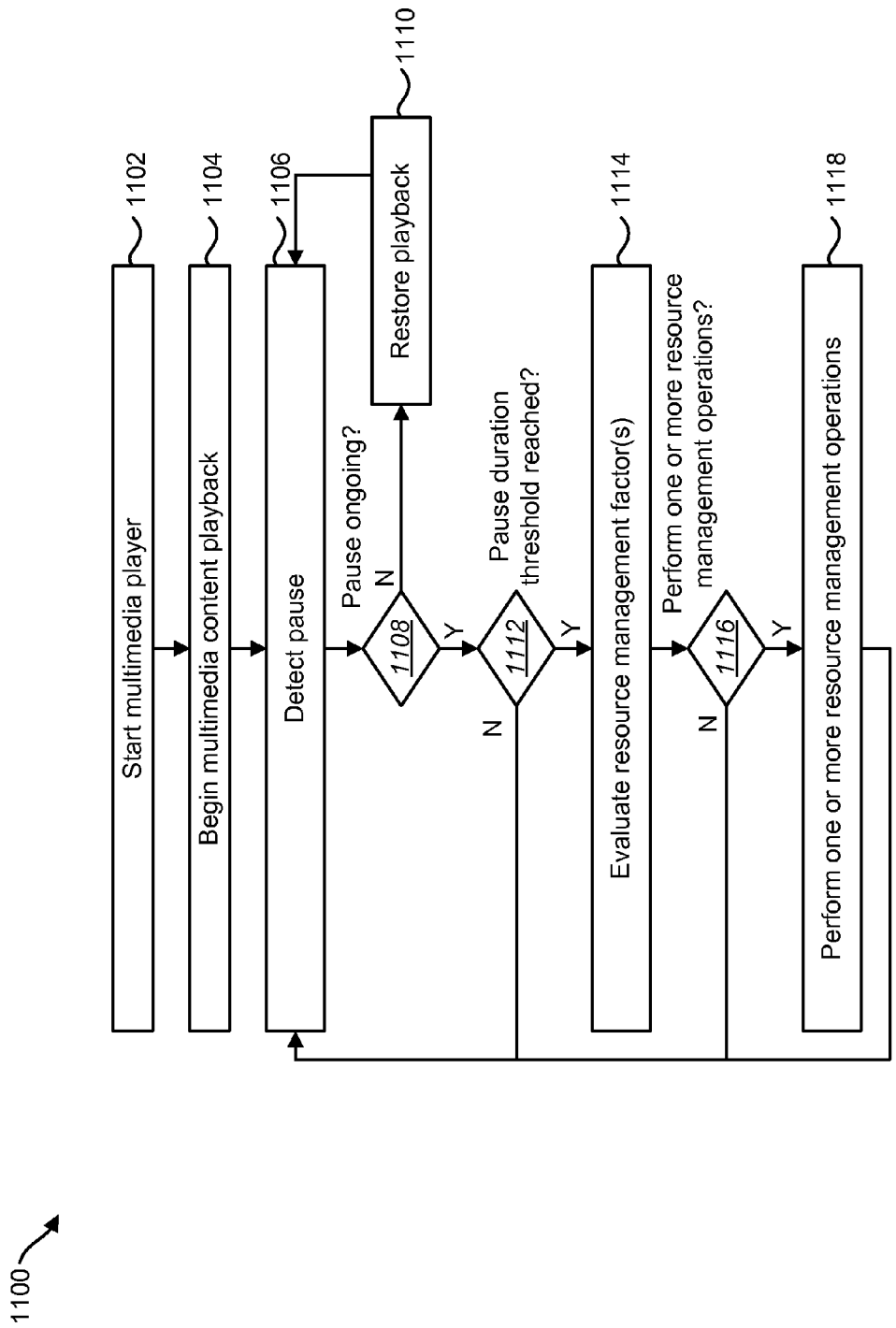
FIG. 11 is a flow diagram illustrating another configuration of a method for using pause to manage resources.

FIG. 11 is a flow diagram illustrating another configuration of a method 1100 for using pause to manage resources. An electronic device 102 may start 1102 a multimedia player 104. The electronic device 102 may begin 1104 multimedia content 120 playback. The electronic device 102 may then detect 1106 a pause operation 112. The electronic device 102 may determine 1108 whether the pause operation 112 is ongoing. For example, the electronic device 102 may initially detect 1106 a pause operation 112, but may later detect that the pause operation 1106 has been discontinued. For instance, an event may occur indicating that resumption of multimedia content playback is desired.

If the electronic device 102 determines 1108 that the pause 112 is not ongoing, the electronic device 102 may restore 1110 playback (if possible). For example, if the pause duration has been long enough for performance 1118 of one or more resource management operations, the electronic device 102 may need to restore certain resources to the multimedia player 104 in order for playback to resume. For instance, if multimedia content 120 decoding and a remote session (e.g., with a remote electronic device 224 providing the multimedia content 120) have been terminated, the electronic device 102 may need to establish (or restore) a remote session and restore multimedia content 120 decoding for multimedia content 120 playback to be restored 1110. If restoration 1110 is possible (e.g., depending on which resource management operations 338 have been performed and other factors), the electronic device 102 may reestablish the resources (e.g., local resources 218, remote resources 226, locally networked resources 230, etc.) needed to restore 1110 playback.

If the electronic device 102 determines 1108 that the pause operation 112 is ongoing, it 102 may determine 1112 whether a pause duration threshold 332 is reached. If the pause duration threshold is not reached, the electronic device 102 may return to detecting 1106 a pause operation 112. If the pause duration threshold is reached, the electronic device 102 may evaluate 1114 one or more resource management factors. The electronic device 102 may then determine 1116 whether to perform one or more resource management operations 338. If the electronic device 102 determines 1116 not to perform one or more resource management operations 338, the electronic device 102 may return to detecting 1106 a pause operation 112. If the electronic device 102 determines 1116 that one or more resource management operations 338 should be performed, the electronic device 102 may perform 1118 the one or more resource management operations, and return to detecting 1106 a pause operation.

Figure 12:
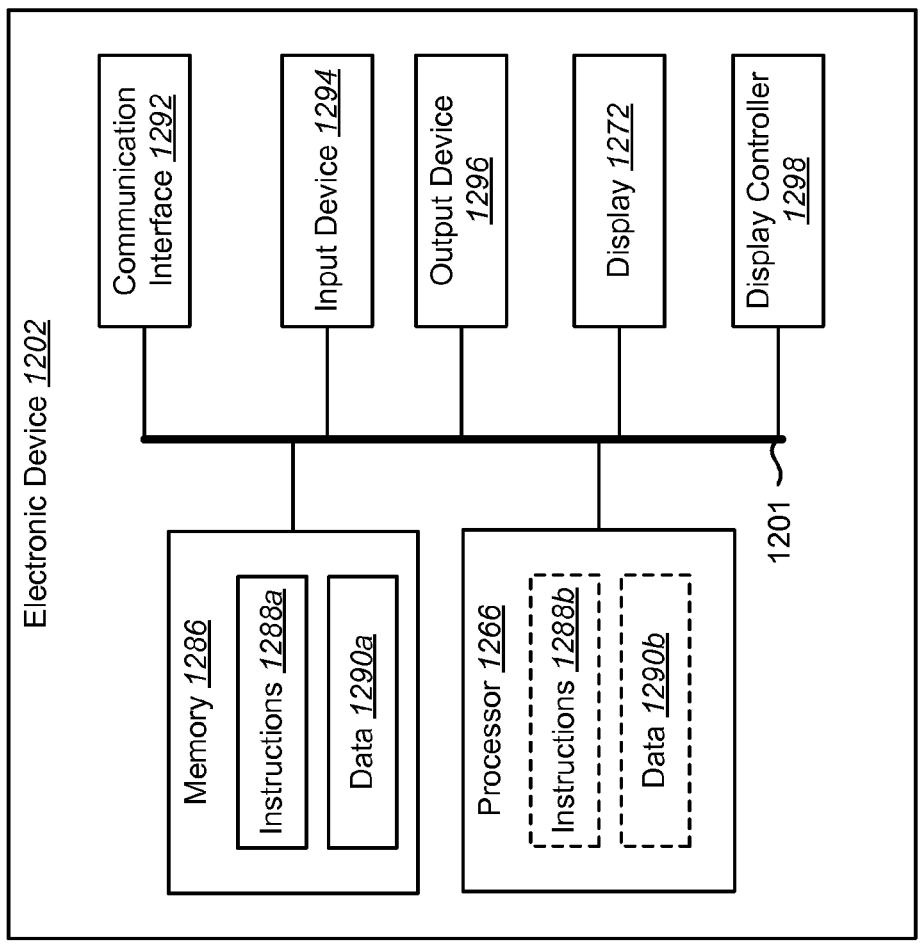
FIG. 12 illustrates various components that may be utilized in an electronic device.

FIG. 12 illustrates various components that may be utilized in an electronic device 1202. The illustrated components may be located within the same physical structure or in separate housings or structures. The electronic devices 102, 202 discussed in relation to FIGS. 1 and 2 may be configured similarly to the electronic device 1202. The electronic device 1202 includes a processor 1266. The processor 1266 may be a general purpose single- or multi-chip microprocessor (e.g., an ARM), a special purpose microprocessor (e.g., a digital signal processor (DSP)), a microcontroller, a programmable gate array, etc. The processor 1266 may be referred to as a central processing unit (CPU). Although just a single processor 1266 is shown in the electronic device 1202 of FIG. 12, in an alternative configuration, a combination of processors (e.g., an ARM and DSP) could be used.

The electronic device 1202 also includes memory 1286 in electronic communication with the processor 1266. That is, the processor 1266 can read information from and/or write information to the memory 1286. The memory 1286 may be any electronic component capable of storing electronic information. The memory 1286 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1290a and instructions 1288a may be stored in the memory 1286. The instructions 1288a may include one or more programs, routines, sub-routines, functions, procedures, etc. The instructions 1288a may include a single computer-readable statement or many computer-readable statements. The instructions 1288a may be executable by the processor 1266 to implement the methods 400, 500, 900, 1100 that were described above. Executing the instructions 1288a may involve the use of the data 1290a that is stored in the memory 1286. FIG. 12 shows some instructions 1288b and data 1290b being loaded into the processor 1266.

The electronic device 1202 may also include one or more communication interfaces 1292 for communicating with other electronic devices. The communication interfaces 1292 may be based on wired communication technology, wireless communication technology, or both. Examples of different types of communication interfaces 1292 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1202 may also include one or more input devices 1294 and one or more output devices 1296. Examples of different kinds of input devices 1294 include a keyboard, mouse, microphone, remote control device, button, joystick, trackball, touchpad, lightpen, etc. Examples of different kinds of output devices 1296 include a speaker, printer, etc. One specific type of output device which may be typically included in an electronic device 1202 is a display device 1272. Display devices 1272 used with configurations disclosed herein may utilize any suitable image projection technology, such as a cathode ray tube (CRT), liquid crystal display (LCD), light-emitting diode (LED), gas plasma, electroluminescence, or the like. A display controller 1298 may also be provided for converting data stored in the memory 1286 into text, graphics and/or moving images (as appropriate) shown on the display device 1272.

The various components of the electronic device 1202 may be coupled together by one or more buses, which may include a power bus, a control signal bus, a status signal bus, a data bus, etc. For simplicity, the various buses are illustrated in FIG. 12 as a bus system 1201. It should be noted that FIG. 12 illustrates only one possible configuration of an electronic device 1202. Various other architectures and components may be utilized.

Figure 13:
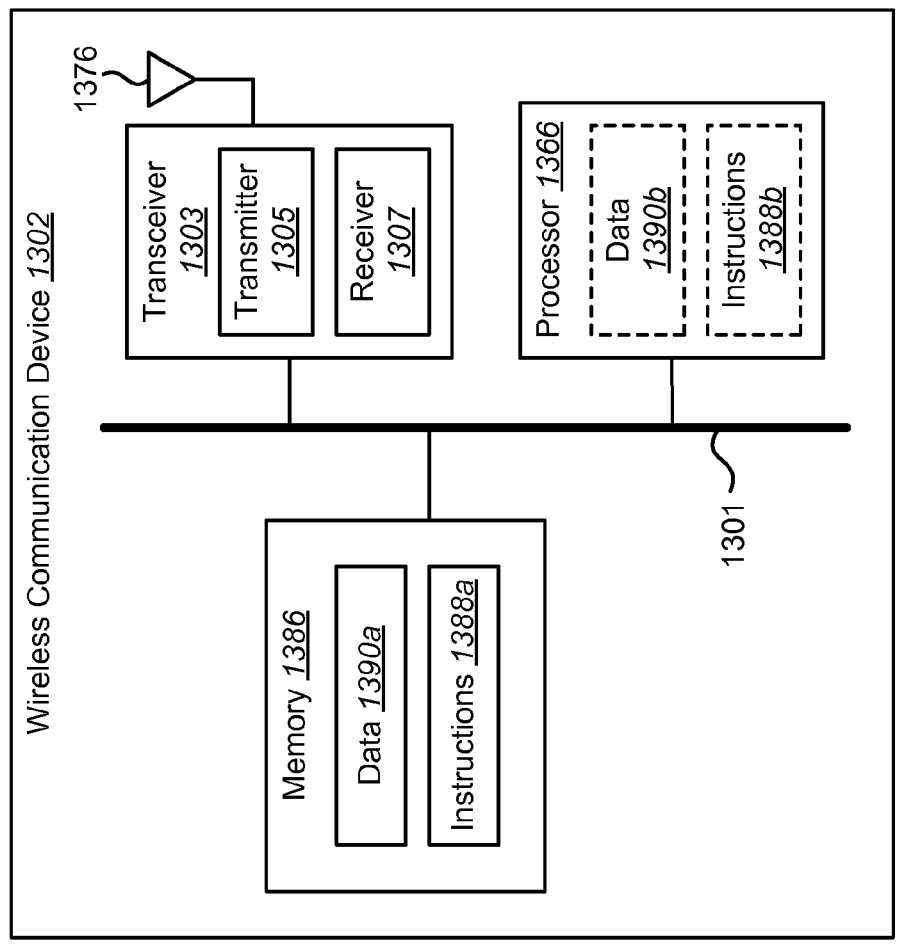
FIG. 13 illustrates certain components that may be included within a wireless communication device.

FIG. 13 illustrates certain components that may be included within a wireless communication device 1302. The wireless communication device 1002 described previously may be configured similarly to the wireless communication device 1302 that is shown in FIG. 13. The wireless communication device 1302 includes a processor 1366. The processor 1366 may be a general purpose single- or multi-chip microprocessor (e.g., an ARM), a special purpose microprocessor (e.g., a digital signal processor (DSP)), a microcontroller, a programmable gate array, etc. The processor 1366 may be referred to as a central processing unit (CPU). Although just a single processor 1366 is shown in the wireless communication device 1302 of FIG. 13, in an alternative configuration, a combination of processors (e.g., an ARM and DSP) could be used.

The wireless communication device 1302 also includes memory 1386 in electronic communication with the processor 1366 (i.e., the processor 1366 can read information from and/or write information to the memory 1386). The memory 1386 may be any electronic component capable of storing electronic information. The memory 1386 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1390a and instructions 1388a may be stored in the memory 1386. The instructions 1388a may include one or more programs, routines, sub-routines, functions, procedures, etc. The instructions 1388a may include a single computer-readable statement or many computer-readable statements. The instructions 1388a may be executable by the processor 1366 to implement the methods 400, 500, 900, 1100 that were described above. Executing the instructions 1388a may involve the use of the data 1390a that is stored in the memory 1386. FIG. 13 shows some instructions 1388b and data 1390b being loaded into the processor 1366.

The wireless communication device 1302 may also include a transmitter 1305 and a receiver 1307 to allow transmission and reception of signals between the wireless communication device 1302 and a remote location (e.g., a base station or other wireless communication device). The transmitter 1305 and receiver 1307 may be collectively referred to as a transceiver 1303. An antenna 1376 may be electrically coupled to the transceiver 1303. The wireless communication device 1302 may also include (not shown) multiple transmitters, multiple receivers, multiple transceivers and/or multiple antenna.

The various components of the wireless communication device 1302 may be coupled together by one or more buses, which may include a power bus, a control signal bus, a status signal bus, a data bus, etc. For simplicity, the various buses are illustrated in FIG. 13 as a bus system 1301.

Figure 14:
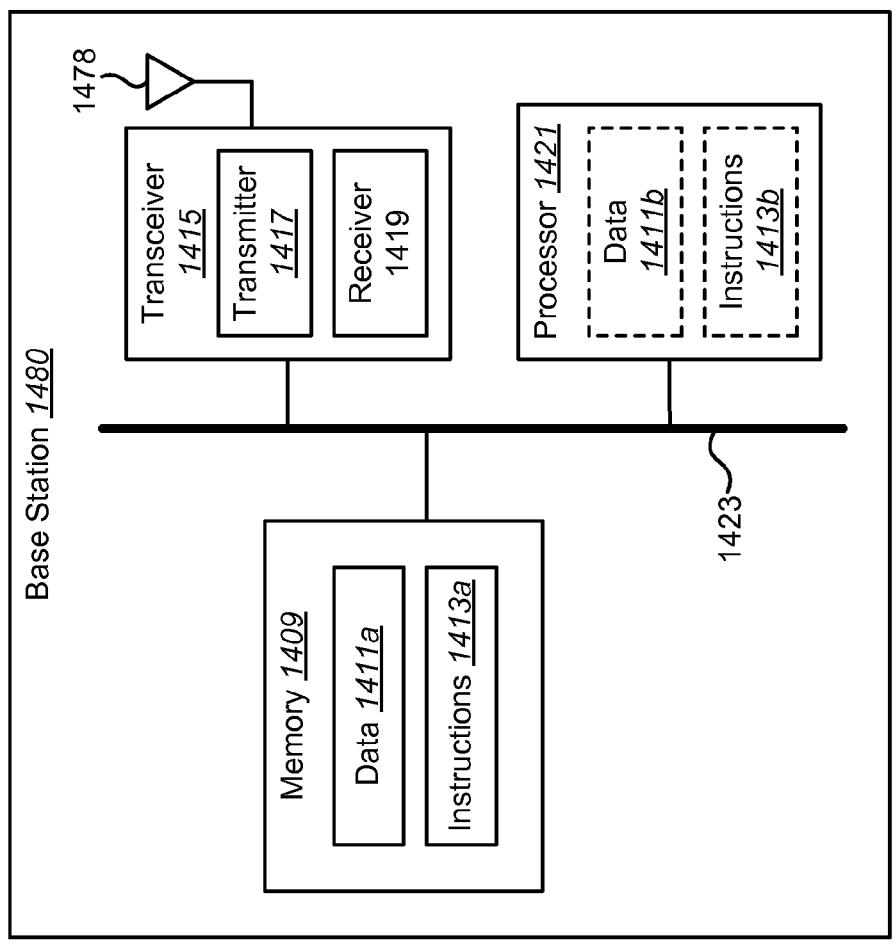
FIG. 14 illustrates certain components that may be included within a base station.

FIG. 14 illustrates certain components that may be included within a base station 1480. The base station 1080 discussed previously may be configured similarly to the base station 1480 shown in FIG. 14. The base station 1480 includes a processor 1421. The processor 1421 may be a general purpose single- or multi-chip microprocessor (e.g., an ARM), a special purpose microprocessor (e.g., a digital signal processor (DSP)), a microcontroller, a programmable gate array, etc. The processor 1421 may be referred to as a central processing unit (CPU). Although just a single processor 1421 is shown in the base station 1480 of FIG. 14, in an alternative configuration, a combination of processors (e.g., an ARM and DSP) could be used.

The base station 1480 also includes memory 1409 in electronic communication with the processor 1421 (i.e., the processor 1421 can read information from and/or write information to the memory 1409). The memory 1409 may be any electronic component capable of storing electronic information. The memory 1409 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1411a and instructions 1413a may be stored in the memory 1409. The instructions 1413a may include one or more programs, routines, sub-routines, functions, procedures, etc. The instructions 1413a may include a single computer-readable statement or many computer-readable statements. The instructions 1413a may be executable by the processor 1421. Executing the instructions 1413a may involve the use of the data 1411a that is stored in the memory 1409. FIG. 14 shows some instructions 1413b and data 1411b being loaded into the processor 1421.

The base station 1480 may also include a transmitter 1417 and a receiver 1419 to allow transmission and reception of signals between the base station 1480 and a remote location (e.g., a wireless communication device). The transmitter 1417 and receiver 1419 may be collectively referred to as a transceiver 1415. An antenna 1478 may be electrically coupled to the transceiver 1415. The base station 1480 may also include (not shown) multiple transmitters, multiple receivers, multiple transceivers and/or multiple antenna.

The various components of the base station 1480 may be coupled together by one or more buses, which may include a power bus, a control signal bus, a status signal bus, a data bus, etc. For simplicity, the various buses are illustrated in FIG. 14 as a bus system 1423.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
   a processor;
   a memory in electronic communication with the processor;
   instructions stored in the memory, the instructions being executable to:
   monitor a pause duration corresponding to a pause operation that suspends presentation of multimedia content on the electronic device, wherein monitoring the pause duration is based on a series of increasing pause duration thresholds;
   evaluate one or more resource management factors at each of the series of increasing pause duration thresholds to determine whether to perform a resource management operation,
   wherein the evaluation is based on selecting one or more resource management factors and one or more weights associated with each of the selected resource management factors,
   wherein the resource management factors further comprise a content source, a power resources remaining, a device temperature, one or more concurrent tasks, a user behavior, user requirements, a continued operation expectation, a content type, a distant acknowledgment, a content format, a content duration and a communication configuration; and perform the resource management operation by reducing resource consumption upon reaching each pause duration thresholds by progressively releasing resources being used to maintain the paused multimedia content, wherein the resource management operation further comprises one or more of outputting a prompt, terminating one or more applications, discontinuing decoding, allowing standby, notifying one or more remote devices, notifying one or more locally networked devices and caching processed data.

2. The electronic device of claim 1, wherein the one or more resource management factors further comprise processor usage, memory usage and power usage.

3. The electronic device of claim 1, wherein monitoring the pause duration comprises:
   detecting the pause operation; and
   determining whether the pause duration is greater than or equal to one or more of the pause duration thresholds.

4. The electronic device of claim 1, wherein monitoring the pause duration further comprises:
   determining whether the pause operation is ongoing; and
   restoring content playback if the pause operation is not ongoing.

5. The electronic device of claim 1, wherein the resource management operation controls local resources.

6. The electronic device of claim 1, wherein the resource management operation controls distant resources.

7. The electronic device of claim 1, wherein determining whether to perform a resource management operation comprises:
   determining an operation value; and
   selecting one or more resource management operations based on the operation value.

8. The electronic device of claim 1, wherein the electronic device is a wireless communication device.

9. The electronic device of claim 1, wherein multimedia content is paused.

10. A method for using a pause duration to manage resources, comprising:
    monitoring the pause duration corresponding to a pause operation that suspends presentation of multimedia content on an electronic device, wherein monitoring the pause duration is based on a series of increasing pause duration thresholds;
    evaluating one or more resource management factors at each of the series of increasing pause duration thresholds to determine whether to perform a resource management operation,
    wherein the evaluation is based on selecting one or more resource management factors and one or more weights associated with each of the selected resource management factors,
    wherein the resource management factors further comprise a content source, a power resources remaining, a device temperature, one or more concurrent tasks, a user behavior, user requirements, a continued operation expectation, a content type, a distant acknowledgment, a content format, a content duration and a communication configuration; and
    performing, on the electronic device, the resource management operation by reducing resource consumption upon reaching each pause duration thresholds by progressively releasing resources being used to maintain the paused multimedia content,
    wherein the resource management operation further comprises one or more of outputting a prompt, terminating one or more applications, discontinuing decoding, allowing standby, notifying one or more remote devices, notifying one or more locally networked devices and caching processed data.

11. The method of claim 10, wherein the one or more resource management factors further comprise processor usage, memory usage and power usage.

12. The method of claim 10, wherein monitoring the pause duration comprises:
    detecting the pause operation; and
    determining whether the pause duration is greater than or equal to one or more of the pause duration thresholds.

13. The method of claim 10, wherein monitoring the pause duration further comprises:
    determining whether the pause operation is ongoing; and
    restoring content playback if the pause operation is not ongoing.

14. The method of claim 10, wherein the resource management operation controls local resources.

15. The method of claim 10, wherein the resource management operation controls distant resources.

16. The method of claim 10, wherein determining whether to perform a resource management operation comprises:
    determining an operation value; and
    selecting one or more resource management operations based on the operation value.

17. The method of claim 10, wherein the electronic device is a wireless communication device.

18. The method of claim 10, wherein multimedia content is paused.

19. A computer-program product for using a pause duration to manage resources, the computer-program product comprising a non-transitory computer-readable medium having instructions thereon, the instructions comprising:
    code for causing an electronic device to monitor the pause duration corresponding to a pause operation that suspends presentation of multimedia content on the electronic device, wherein monitoring the pause duration is based on a series of increasing pause duration thresholds;
    code for causing the electronic device to evaluate one or more resource management factors at each of the series of increasing pause duration thresholds to determine whether to perform a resource management operation,
    wherein the evaluation is based on selecting one or more resource management factors and one or more weights associated with each of the selected resource management factors,
    wherein the resource management factors further comprise a content source, a power resources remaining, a device temperature, one or more concurrent tasks, a user behavior, user requirements, a continued operation expectation, a content type, a distant acknowledgment, a content format, a content duration and a communication configuration; and
    code for causing the electronic device to perform the resource management operation by reducing resource consumption upon reaching each pause duration thresholds by progressively releasing resources being used to maintain the paused multimedia content,
    wherein the resource management operation further comprises one or more of outputting a prompt, terminating one or more applications, discontinuing decoding, allowing standby, notifying one or more remote devices, notifying one or more locally networked devices and caching processed data.

20. The computer-program product of claim 19, wherein monitoring the pause duration comprises:
   detecting the pause operation; and
   determining whether the pause duration is greater than or equal to one or more of the pause duration thresholds.

21. An apparatus, having a processor, for using a pause duration to manage resources, comprising:
   means for monitoring the pause duration corresponding to a pause operation that suspends presentation of multimedia content on the apparatus, wherein monitoring the pause duration is based on a series of increasing pause duration thresholds;
   means for evaluating one or more resource management factors at each of the series of increasing pause duration thresholds to determine whether to perform a resource management operation,
   wherein the evaluation is based on selecting one or more resource management factors and one or more weights associated with each of the selected resource management factors,
   wherein the resource management factors further comprise a content source, a power resources remaining, a device temperature, one or more concurrent tasks, a user behavior, user requirements, a continued operation expectation, a content type, a distant acknowledgment, a content format, a content duration and a communication configuration; and
   means for performing the resource management operation by reducing resource consumption upon reaching each pause duration thresholds by progressively releasing resources being used to maintain the paused multimedia content,
   wherein the resource management operation further comprises one or more of outputting a prompt, terminating one or more applications, discontinuing decoding, allowing standby, notifying one or more remote devices, notifying one or more locally networked devices and caching processed data.

22. The apparatus of claim 21, wherein monitoring the pause duration comprises:
   detecting the pause operation; and
   determining whether the pause duration is greater than or equal to one or more of the pause duration thresholds.

* * * * *